United States Patent
Teramoto et al.

(10) Patent No.: US 9,200,154 B2
(45) Date of Patent: Dec. 1, 2015

(54) POROUS RESIN PARTICLES, METHOD OF MANUFACTURING THE SAME, AND USE OF THE SAME

(71) Applicant: SEKISUI PLASTICS CO., LTD., Osaka-shi, Osaka (JP)

(72) Inventors: Kenzo Teramoto, Tokyo (JP); Junko Hiroi, Shiga (JP); Masaaki Nakamura, Shiga (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 116 days.

(21) Appl. No.: 13/850,575

(22) Filed: Mar. 26, 2013

(65) Prior Publication Data
US 2013/0266797 A1 Oct. 10, 2013

(30) Foreign Application Priority Data
Mar. 27, 2012 (JP) ................................. 2012-071485

(51) Int. Cl.
| | |
|---|---|
| B32B 3/26 | (2006.01) |
| B32B 27/08 | (2006.01) |
| B32B 5/16 | (2006.01) |
| C08L 33/12 | (2006.01) |
| C08J 9/00 | (2006.01) |
| C08J 9/20 | (2006.01) |

(52) U.S. Cl.
CPC .. *C08L 33/12* (2013.01); *C08J 9/00* (2013.01); *C08J 9/20* (2013.01); *C08J 2333/12* (2013.01); *Y10T 428/254* (2015.01); *Y10T 428/2982* (2015.01)

(58) Field of Classification Search
CPC ......... A61K 8/02; A61K 8/0279; A61K 8/37; C08L 33/04; C08L 33/08; C08L 33/12; Y10T 428/2982; Y10T 428/31786
USPC ........................................................ 428/402
See application file for complete search history.

(56) References Cited

U.S. PATENT DOCUMENTS

| | | | | |
|---|---|---|---|---|
| 5,314,923 A | * | 5/1994 | Cooke et al. | 521/64 |
| 2009/0035334 A1 | | 2/2009 | Kim et al. | |
| 2009/0209722 A1 | * | 8/2009 | Jiang et al. | 528/25 |
| 2012/0034281 A1 | | 2/2012 | Kaneko et al. | |
| 2015/0004127 A1 | * | 1/2015 | Ishimori et al. | 424/78.03 |

FOREIGN PATENT DOCUMENTS

| | | |
|---|---|---|
| JP | 50-12176 A | 2/1975 |
| JP | 57-98205 A | 6/1982 |
| JP | 61-69816 A | 4/1986 |
| JP | 2000-191818 A | 7/2000 |
| JP | 2002-265529 A | 9/2002 |
| JP | 2003-81738 A | 3/2003 |
| JP | 2003-286312 A | 10/2003 |
| WO | 2010/114125 A1 | 10/2010 |

OTHER PUBLICATIONS

Cosmetic Catalogs from Sunjin (p. 48-54), 2013.
Technical Data Sheets for SUNPMMA-PH, SUNPMMA-P, SUNPMMA-COCO170, and SUNPMMA-COCO130 issued by Sunjin Chemical, dated Apr. 9, 2009.

* cited by examiner

*Primary Examiner* — Holly Le
(74) *Attorney, Agent, or Firm* — Greenblum & Bernstein, P.L.C.

(57) ABSTRACT

The present invention provides porous resin particles made of a polymer of a monomer mixture, wherein the monomer mixture contains, as monomers, at least methyl methacrylate and a (meth)acrylic-based cross-linkable monomer, a content of the methyl methacrylate in the monomer mixture is 1 to 50% by weight, a content of the (meth)acrylic-based cross-linkable monomer in the monomer mixture is 50 to 99% by weight, the porous resin particles have a specific surface area of 130 to 180 m²/g, a pore volume of 0.3 to 0.7 ml/g, and an average pore size of 13 to 16 nm, an amount of unreacted methyl methacrylate remaining in the porous resin particles is 20 ppm or less, and the porous resin particles have a thermal decomposition starting temperature of 260° C. or more.

19 Claims, No Drawings

POROUS RESIN PARTICLES, METHOD OF MANUFACTURING THE SAME, AND USE OF THE SAME

TECHNICAL FIELD

The present invention relates to porous resin particles having excellent thermal resistance, a method of manufacturing these porous resin particles, and use of the same (external preparations, coating agents, optical films, resin compositions, and molded bodies).

BACKGROUND ART

Conventionally, porous resin particles (specifically, acrylic-based cross-linked resin particles and styrene-based cross-linked resin fine particles) are commonly used, for example, as additives to external preparations such as cosmetics and additives to coating agents such as coating materials (e.g., matting agents for coating materials); light diffusion agents for light diffusion members such as illumination covers and light diffusion plates, and for optical films such as light diffusion films and glare-proof films in liquid crystal display apparatuses; blocking preventing agents for films; and the like.

For example, light diffusion members such as illumination covers and light diffusion plates containing the porous resin particles as a light diffusion agent are manufactured by mixing the resin particles as a light diffusion agent in a base material resin, and subjecting the resulting resin composition to molding such as extrusion molding or injection molding.

As a method of manufacturing porous resin particles, for example, Patent Documents 1 to 4 disclose methods in which a monomer mixture containing a monofunctional monomer such as (meth)acrylic acid or (meth)acrylic acid ester and a cross-linkable ethylenic monomer having 2 or more vinyl groups (crosslinking agent) is subjected to suspension-polymerization in the presence of a polymerization initiator and an organic solvent as a pore forming agent, after which the pore forming agent is removed. Furthermore, Patent Document 5 discloses a method in which polymer seed particles manufactured with styrene, (meth)acrylic acid ester, or the like are caused to absorb a cross-linkable monomer and a polymerization initiator, after which the cross-linkable monomer is polymerized, and, thus, a polymer (porous resin particles) having a composition different from that of the original polymer particles is obtained.

CITATION LIST

Patent Document

[Patent Document 1] JP S50-12176A
[Patent Document 2] JP S61-69816A
[Patent Document 3] JP 2003-81738A
[Patent Document 4] JP 2003-286312A
[Patent Document 5] JP 2000-191818A

SUMMARY OF INVENTION

Technical Problem

However, the porous resin particles obtained by the manufacturing method disclosed in Patent Documents 1 to 5 contain a large amount of impurities such as unreacted monomer or polymerization initiator residue, and do not have sufficient thermal resistance. Accordingly, if these porous resin particles are used as a component mixed in the base material resin, the porous resin particles cause molding failure such as turning the color of the obtained resin composition to yellow or forming die buildup. Note that, in this specification, "die buildup" refers to burnt resin that is accumulated around a die over time during extrusion of plastic (resin composition).

Accordingly, there is a demand for development of porous resin particles having high thermal resistance.

The present invention was made in view of these circumstances, and it is an object thereof to provide porous resin particles having high thermal resistance, a method of manufacturing these porous resin particles, and use of the same.

Solution to Problem

The present invention is directed to porous resin particles made of a polymer of a monomer mixture, wherein the monomer mixture contains, as monomers, at least methyl methacrylate and a (meth)acrylic-based cross-linkable monomer, a content of the methyl methacrylate in the monomer mixture is 1 to 50% by weight, a content of the (meth)acrylic-based cross-linkable monomer in the monomer mixture is 50 to 99% by weight, the porous resin particles have a specific surface area of 130 to 180 m$^2$/g, a pore volume of 0.3 to 0.7 ml/g, and an average pore size of 13 to 16 nm, an amount of unreacted methyl methacrylate remaining in the porous resin particles is 20 ppm or less, and the porous resin particles have a thermal decomposition starting temperature of 260° C. or more.

These porous resin particles of the present invention are made of a polymer of a monomer mixture containing 50 to 99% by weight of (meth)acrylic-based cross-linkable monomer, and have a thermal decomposition starting temperature that is as high as 260° C. or more, and, thus, porous resin particles are excellent in the thermal resistance. Furthermore, the thermal decomposition starting temperature of the porous resin particles of the present invention is as high as 260° C. or more, and the amount of unreacted methyl methacrylate remaining in the porous resin particles is 20 ppm or less. Accordingly, when the porous resin particles of the present invention are mixed with the base material resin and the mixture is subjected to extrusion molding, the porous resin particles are unlikely to cause molding failure such as turning the color to yellow or forming die buildup. Moreover, the porous resin particles of the present invention have a specific surface area of 130 to 180 m$^2$/g, a pore volume of 0.3 to 0.7 ml/g, and an average pore size of 13 to 16 nm, and, thus, the porous resin particles can have high particle strength.

Furthermore, the porous resin particles of the present invention have a specific surface area of 130 to 180 m$^2$/g, a pore volume of 0.3 to 0.7 ml/g, and an average pore size of 13 to 16 nm, that is, have a sufficient porosity that allows light diffusing properties to be exhibited. Accordingly, when being added to an external preparation such as a cosmetic, the porous resin particles of the present invention can provide the external preparation with soft focusing properties that can diminish the appearance of skin pores, wrinkles, dark spots, and the like. Furthermore, when being mixed into a coating agent, an optical film, or a light diffusion member, the porous resin particles can provide the coating agent, the optical film, or the light diffusion member with light diffusing properties. It is assumed that the term "light diffusing properties" described in this specification refers to both properties of diffusing reflected light and properties of diffusing transmitted light.

Moreover, the present invention is directed to a method of manufacturing porous resin particles, including: a polymerization step of suspension-polymerizing a monomer mixture containing 1 to 50% by weight of methyl methacrylate and 50 to 99% by weight of (meth)acrylic-based cross-linkable monomer, in the presence of an organic solvent, a polymerization initiator, and an inorganic dispersion stabilizer, in an aqueous medium, thereby obtaining a suspension containing porous resin particles; a distillation step of, after the polymerization step, distilling the suspension, thereby removing the organic solvent from the suspension; and a drying step of, after the distillation step, drying the porous resin particles collected by filtering from the suspension, at 80° C. or more, under a reduced pressure of 0.015 MPa or less, for 12 hours or more.

According to the method of manufacturing porous resin particles of the present invention, in the polymerization step, a monomer mixture containing the (meth)acrylic-based cross-linkable monomer in an amount that is as large as 50 to 99% by weight. Also, the method further includes, after the distillation step of removing the organic solvent, the drying step of drying the obtained porous resin particles at 80° C. or more, under a reduced pressure of 0.015 MPa or less, for 12 hours or more. If a monomer mixture containing a large amount of (meth)acrylic-based cross-linkable monomer is used in the polymerization step, and the distillation step and the drying step are included in this manner, the polymerization initiator and unreacted portion of the monomer used in the polymerization step can be removed from the porous resin particles. Thus, porous resin particles with less impurities and high thermal resistance can be obtained.

Furthermore, the porous resin particles manufactured by the manufacturing method of the present invention have a sufficient porosity that allows light diffusing properties to be exhibited. Accordingly, when being added to an external preparation such as a cosmetic, the porous resin particles manufactured by the manufacturing method of the present invention can provide the external preparation with soft focusing properties that can diminish the appearance of skin pores, wrinkles, dark spots, and the like. Furthermore, when being mixed into a coating agent, an optical film, or a light diffusion member, the porous resin particles can provide the coating agent, the optical film, or the light diffusion member with light diffusing properties.

Moreover, the present invention is directed to an external preparation containing the porous resin particles of the present invention.

The external preparation of the present invention contains the porous resin particles of the present invention having a sufficient porosity that allows light diffusing properties to be exhibited. Thus, the external preparation is excellent in the soft focusing properties that can diminish the appearance of skin pores, wrinkles, dark spots, and the like, through light diffusion.

Moreover, the present invention is directed to a coating agent containing the porous resin particles of the present invention.

The coating agent of the present invention contains the porous resin particles of the present invention having a sufficient porosity that allows light diffusing properties to be exhibited. Thus, the coating agent is excellent in the light diffusing properties. Accordingly, when being used as a finish coating material, the coating agent can provide excellent mat properties.

Moreover, the present invention is directed to an optical film formed by applying the coating agent of the present invention to a base material.

The optical film of the present invention is formed by applying the coating agent of the present invention excellent in the light diffusing properties. Thus, the optical film is excellent in the light diffusing properties.

Moreover, the present invention is directed to a resin composition containing the porous resin particles of the present invention and a base material resin.

The resin composition of the present invention contains the porous resin particles of the present invention having a sufficient porosity that allows light diffusing properties to be exhibited. Thus, the resin composition is excellent in the light diffusing properties.

Moreover, the present invention is directed to a molded body formed by molding the resin composition of the present invention.

The molded body of the present invention is formed by molding the resin composition of the present invention excellent in the light diffusing properties. Thus, the molded body is excellent in the light diffusing properties.

Advantageous Effects of the Invention

The present invention can provide porous resin particles having high thermal resistance, a method of manufacturing these porous resin particles, and use of the same.

DESCRIPTION OF EMBODIMENTS

Porous Resin Particles

The porous resin particles of the present invention are porous resin particles made of a polymer of a monomer mixture, wherein the monomer mixture contains, as monomers, at least methyl methacrylate and a (meth)acrylic-based cross-linkable monomer. A content of the methyl methacrylate in the monomer mixture is 1 to 50% by weight, and a content of the (meth)acrylic-based cross-linkable monomer in the monomer mixture is 50 to 99% by weight. Furthermore, the porous resin particles of the present invention have a specific surface area of 130 to 180 $m^2/g$, a pore volume of 0.3 to 0.7 ml/g, and an average pore size of 13 to 16 nm. Furthermore, the amount of unreacted methyl methacrylate remaining in the porous resin particles of the present invention is 20 ppm or less. The porous resin particles have a thermal decomposition starting temperature of 260° C. or more.

Note that, in this specification, "(meth)acrylic" refers to methacrylic or acrylic.

Furthermore, the quantity, the quality, and the like of a structural unit derived from each monomer in the porous resin particles of the present invention can be determined using known analysis methods such as gas chromatography, liquid chromatography, infrared spectroscopy (IR), or nuclear magnetic resonance spectroscopy (NMR). Note that the weight ratio of each monomer in the monomer mixture is substantially the same as the weight ratio in a structural unit derived from each monomer in the porous resin particles of the present invention.

The porous resin particles of the present invention contain a structural unit derived from the methyl methacrylate.

A content of methyl methacrylate in the monomer mixture is 1 to 50% by weight, preferably 10 to 50% by weight. If the content of the methyl methacrylate in the monomer mixture is 1 to 50% by weight, the (meth)acrylic-based cross-linkable monomer can be sufficiently contained in the monomer mixture. Thus, the porous resin particles can be sufficiently porous so as to be provided with a large specific surface area, and, at the same time, the porous resin particles can be provided with sufficient thermal resistance and sufficient particle strength.

Furthermore, the porous resin particles of the present invention contain a structural unit derived from the (meth) acrylic-based cross-linkable monomer. As the (meth)acrylic-based cross-linkable monomer, known (meth)acrylic-based monomers having 2 or more unsaturated ethylenic groups may be used, as long as they do not affect the thermal resistance of the porous resin particles of the present invention.

Examples of the (meth)acrylic-based cross-linkable monomer include ethylene glycol di(meth)acrylate, 1,6-hexanediol di(meth)acrylate, allyl(meth)acrylate, trimethylolpropane tri(meth)acrylate, pentaerythritol tetra(meth)acrylate, and the like. Of these substances, ethylene glycol di(meth)acrylate is particularly excellent in the effect of improving the thermal resistance of the porous resin particles. These (meth)acrylic-based cross-linkable monomers described above may be used alone or in a combination of two or more. Note that, in this specification, "(meth)acrylate" refers to methacrylate or acrylate.

An content of the (meth)acrylic-based cross-linkable monomer in the monomer mixture is 50 to 99% by weight, preferably 50 to 90% by weight. If the content of the (meth) acrylic-based cross-linkable monomer in the monomer mixture is 50 to 99% by weight, the porous resin particles can be sufficiently porous so as to be provided with a large specific surface area, and, at the same time, the porous resin particles can be provided with sufficient thermal resistance and sufficient particle strength.

Furthermore, the porous resin particles of the present invention may further contain a structural unit derived from a monomer other than the methyl methacrylate and the (meth) acrylic-based cross-linkable monomer described above, as long as it does not affect the thermal resistance of the porous resin particles of the present invention.

Furthermore, in order to further improve the thermal resistance, the porous resin particles of the present invention may contain an antioxidant. There is no particular limitation on the antioxidant, and known materials may be used. Examples thereof include: phenolic antioxidants such as 2,6-di-t-butyl-4-methylphenol, n-octadecyl-3-(3',5'-di-t-butyl-4'-hydroxyphenyl)propionate, tetrakis[3-(3,5-di-t-butyl-4-hydroxyphenyl)propionyloxymethyl]methane, tris[N-(3,5-di-t-butyl-4-hydroxybenzyl)] isocyanurate, butylidene-1,1-bis(2-methyl-4-hydroxy-5-t-butylphenyl), triethylene glycol bis[3-(3-t-butyl-4-hydroxy-5-methylphenyl)propionate], and 3,9-bis{2-[3(3-t-butyl-4-hydroxy-5-methylphenyl) propionyloxy]-1,1-dimethylethyl}-2,4,8,10-tetraoxaspiro [5.5]undecane; sulfur antioxidants such as dilauryl-3,3'-thio-dipropionate, dimyristyl-3,3'-thio-dipropionate, distearyl-3,3'-thio-dipropionate, pentaerythritol tetrakis(3-laurylthiopropionate), pentaerythritol tetrakis(thioglycolate), pentaerythritol thiopropionate, pentaerythritol tetrakis(4-butanate), pentaerythritol tetrakis(6-mercaptohexanate), trimethylolpropane tris(thioglycolate), trimethylolpropane tris(thiopropionate), trimethylolpropane tris(thiobutanate), butanediol bis(thioglycolate), ethylene glycol bis(thioglycolate), hexanediol bis(thioglycolate), butanediol bis(thiopropionate), ethylene glycol bis(thiopropionate), octyl thioglycolate, 1-octanethiol, 1-dodecanethiol, and thiosalicylic acid; phosphoric antioxidants such as tris(nonylphenyl)phosphite, tris(2,4-di-t-butylphenyl)phosphite, distearyl pentaerythritol diphosphite, bis(2,4-di-t-butylphenyl)pentaerythritol phosphite, and 2,2-methylenebis(4,6-di-t-butylphenyl)-4,4'-biphenylene diphosphonite; and the like. The antioxidants described above may be used alone or in a combination of two or more.

If the porous resin particles of the present invention contain an antioxidant, the amount of antioxidant contained is preferably 0.01 to 5 parts by weight, more preferably 0.1 to 1 part by weight, with respect to 100 parts by weight of the monomer mixture. If the amount of antioxidant contained is less than 0.01 parts by weight with respect to 100 parts by weight of the monomer mixture, the effect of the antioxidant improving the thermal resistance may not be obtained. On the other hand, if the amount of antioxidant contained is more than 5 parts by weight, the effect of improving the thermal resistance corresponding to the amount of antioxidant contained may not be obtained, which is disadvantageous in terms of cost.

The amount of unreacted methyl methacrylate remaining in the porous resin particles of the present invention is 20 ppm or less. If the amount of unreacted methyl methacrylate remaining in the porous resin particles of the present invention is more than 20 ppm, when the porous resin particles are mixed with the base material resin and the mixture is subjected to extrusion molding, molding failure may occur such as forming die buildup or turning the color of the base material resin (turning the color to yellow).

Furthermore, the porous resin particles of the present invention have a thermal decomposition starting temperature of 260° C. or more, preferably 280° C. or more. If the thermal decomposition starting temperature is less than 260° C., when the porous resin particles are mixed with the base material resin and the mixture is subjected to extrusion molding, molding failure may occur such as forming die buildup or turning the color of the base material resin (turning the color to yellow). Note that a method of measuring the thermal decomposition starting temperature will be described in the section on Examples.

Furthermore, the porous resin particles of the present invention have a specific surface area of 130 to 180 $m^2/g$, preferably 150 to 170 $m^2/g$. If the specific surface area is less than 130 $m^2/g$, the performance of adsorbing substances such as water or oil may not be sufficient. On the other hand, if the specific surface area is more than 180 $m^2/g$, sufficient particle strength may not be obtained. Note that "specific surface area" refers to a surface area per unit weight, and, in the present invention, refers to a specific surface area obtained using the BET method ($N_2$). A method of measuring the specific surface area using the BET method ($N_2$) will be described in the section on Examples.

Furthermore, the porous resin particles of the present invention have a pore volume of 0.3 to 0.7 ml/g, and an average pore size of 13 to 16 nm. If the pore volume is less than 0.3 ml/g, and the average pore size is less than 13 nm, the obtained particles become closer to dense particles, and, thus, the performance of porous resin particles (e.g., water or oil adsorbing performance, low bulk specific gravity, multiple light scattering properties, etc.) may not be obtained. On the other hand, if the pore volume is more than 0.7 ml/g, and the average pore size is more than 16 nm, voids in the porous resin particles are too large, and, thus, sufficient particle strength may not be obtained. Note that "pore volume" refers to a pore volume per unit weight, and, in the present invention, refers to a pore volume obtained using the BJH method from a nitrogen desorption isotherm. Furthermore, "average pore size" refers to an average pore size obtained using the BJH method from a nitrogen desorption isotherm. A method of measuring the pore volume and the average pore size will be described in the section on Examples.

The porous resin particles of the present invention have a volume-average particle size of preferably 1 to 20 μm, more preferably 5 to 15 μm. If the volume-average particle size is within this range, the porous resin particles of the present invention can effectively exhibit the performance of porous resin particles (e.g., water or oil adsorbing performance, low bulk specific gravity, multiple light scattering properties (light diffusing properties), etc.).

The porous resin particles of the present invention have a plurality of pores, and, thus, they can be preferably used, for example, as additives (matting agents, coating film softening agents, designing agents, etc.) to coating agents (coating compositions) that can be used as coating materials, coating agents for paper, coating agents for information recording paper, coating agents for optical members such as optical films, or the like; light diffusion agents that can be mixed into resin compositions for manufacturing molded bodies such as light diffusion members (illumination covers, light diffusion plates, light diffusion films, etc.); blocking preventing agents for films such as food wrapping films; additives to external preparations such as cosmetics (additives for improving the spreadability, absorbing sebaceous matters, or clearing skin problems such as dark spots or wrinkles); and the like.

Method of Manufacturing Porous Resin Particles

The porous resin particles of the present invention can be manufactured using a method of manufacturing porous resin particles, including: a polymerization step of suspension-polymerizing a monomer mixture containing 1 to 50% by weight of methyl methacrylate and 50 to 99% by weight of (meth)acrylic-based cross-linkable monomer, in an aqueous medium, in the presence of an organic solvent, a polymerization initiator, and an inorganic dispersion stabilizer; a distillation step of, after the polymerization step, removing the organic solvent by distillation; and a drying step of, after the distillation step, drying porous resin particles obtained in the polymerization step, at 80° C. or more, under a reduced pressure of 0.015 MPa or less, for 12 hours or more.

Hereinafter, the polymerization step, the distillation step, and the drying step will be described in detail.

—Polymerization Step—

In the polymerization step, a monomer mixture containing 1 to 50% by weight of methyl methacrylate and 50 to 99% by weight of (meth)acrylic-based cross-linkable monomer is subjected to suspension-polymerization, in an aqueous medium, in the presence of an organic solvent, a polymerization initiator, and an inorganic dispersion stabilizer, and, thus, a suspension containing porous resin particles is obtained. In the polymerization step, the suspension-polymerization can be performed, for example, by dispersing droplets of a mixture (oil phase) containing the monomer mixture, the organic solvent, and the polymerization initiator into an aqueous phase containing the aqueous medium and the inorganic dispersion stabilizer, thereby polymerizing the monomer mixture.

There is no particular limitation on the aqueous medium, and examples thereof include: water; and a mixture medium of water and a water-soluble organic medium (lower alcohol (alcohol having 5 or less carbon atoms) such as methanol or ethanol). In order to stabilize the porous resin particles, the aqueous medium is used typically in an amount of 100 to 1000 parts by weight with respect to 100 parts by weight of the monomer mixture.

There is no particular limitation on the inorganic dispersion stabilizer, and known inorganic dispersants may be used. Examples thereof include poorly water-soluble inorganic salts such as calcium carbonate, tricalcium phosphate, calcium pyrophosphate, magnesium hydroxide, magnesium pyrophosphate, and colloidal silica. Of these substances, if a substance that decomposes with acid and dissolves in water (e.g., calcium carbonate, tricalcium phosphate, magnesium hydroxide, magnesium pyrophosphate, or calcium pyrophosphate) is used, the inorganic dispersion stabilizer can be easily removed after the polymerization step. Note that the inorganic dispersion stabilizers listed above may be used alone or in a combination of two or more.

The amount of inorganic dispersion stabilizer used is preferably 0.1 to 20 parts by weight, more preferably 0.5 to 10 parts by weight, with respect to 100 parts by weight of the monomer mixture. If the amount of inorganic dispersion stabilizer used is more than 20 parts by weight, the viscosity of the suspension (reaction liquid) becomes too large, and, thus, the suspension may not flow. On the other hand, if the amount of inorganic dispersion stabilizer used is less than 0.1 parts by weight, the porous resin particles cannot be dispersed as appropriate, and the porous resin particles may be bonded to each other.

In this manner, in the method of manufacturing porous resin particles of the present invention, an inorganic dispersion stabilizer is used as the dispersion stabilizer. Thus, porous resin particles can be obtained that are unlikely to cause coloring (turning the color to yellow) when being mixed with the base material resin.

As described above, the monomer mixture contains, as monomers, at least methyl methacrylate and (meth)acrylic-based cross-linkable monomer in a mixed manner. As described above, the content of the methyl methacrylate in the monomer mixture is 1 to 50% by weight, and the content of the (meth)acrylic-based cross-linkable monomer in the monomer mixture is 50 to 99% by weight. Furthermore, the monomer mixture may further contain a monomer other than the methyl methacrylate and the (meth)acrylic-based cross-linkable monomer.

Furthermore, there is no particular limitation on the organic solvent, as long as it functions as a pore forming agent. Preferably, the organic solvent is highly miscible with the monomer mixture and is poorly soluble in water. Examples of the organic solvent include: aromatic compounds such as toluene and benzene; ester-based compounds such as ethyl acetate and butyl acetate; saturated aliphatic hydrocarbons such as n-heptane, n-hexane, and n-octane; and the like. Of these substances, if a substance that has a boiling point of 69° C. to 90° C., such as benzene (boiling point 80° C.), n-hexane (69° C.), or ethyl acetate (77° C.), is used as the organic solvent, the suspension can be stably performed in the polymerization step, and, furthermore, the organic solvent can be easily removed by distillation in the distillation step. Furthermore, the organic solvents listed above may be used alone or in a combination of two or more.

Furthermore, the organic solvent is used in an amount of preferably 120 to 180 parts by weight, more preferably 130 to 180 parts by weight, with respect to 100 parts by weight of the monomer mixture. If the amount of organic solvent used is not within a range of 120 to 180 parts by weight with respect to 100 parts by weight of the monomer mixture, the obtained porous resin particles may not have a specific surface area and a pore volume specified as those of the porous resin particles of the present invention.

Furthermore, there is no particular limitation on the polymerization initiator, as long as it can start polymerization of the monomer mixture. In terms of relationship with the organic solvent, preferable examples of the polymerization initiator include substances having a 10-hour half-life period temperature of 40 to 80° C., such as: organic peroxide such as benzoyl peroxide, lauroyl peroxide, and t-butylperoxy 2-ethylhexanoate; azo-based nitrile compounds such as 2,2'-azobisisobutyronitrile, 2,2'-azobis(2-methylbutyronitrile), and 2,2'-azobis(2,4-dimethylvaleronitrile); and the like. Note that, if the porous resin particles manufactured using the method of manufacturing porous resin particles of the present invention are used as blocking preventing agents for food wrapping films or additives to cosmetics, the polymerization initiator is preferably such that the polymerization initiator itself and its residue (e.g., decomposition product of the polymerization initiator) are unlikely to affect the human body, preferable examples thereof including organic peroxide, and particularly preferable examples thereof including nonaromatic organic peroxide. Furthermore, the polymerization initiators described above may be used alone or in a combination of two or more.

The amount of polymerization initiator used is preferably 0.01 to 10 parts by weight, more preferably 0.01 to 5 parts by weight, with respect to 100 parts by weight of the monomer mixture. If the amount of polymerization initiator used is less than 0.01 parts by weight with respect to 100 parts by weight of the monomer mixture, it is difficult for the polymerization initiator to have the function of starting polymerization. Furthermore, if the amount of polymerization initiator used is more than 10 parts by weight with respect to 100 parts by weight of the monomer mixture, which is disadvantageous in terms of cost.

When manufacturing the porous resin particles containing the above-described antioxidant, the suspension-polymerization is performed in the presence of the antioxidant. For example, the suspension-polymerization is performed with the mixture (oil phase) containing the monomer mixture, the organic solvent, and the polymerization initiator, and further containing the antioxidant added thereto.

Furthermore, in order to further stabilize the suspension (reaction liquid), the suspension-polymerization may be performed in the presence of a surfactant. For example, a surfactant may be added to the mixture (oil phase) containing the monomer mixture, the organic solvent, and the polymerization initiator, or to the aqueous phase containing the aqueous medium and the inorganic dispersion stabilizer. As the surfactant, all of an anionic surfactant, a cationic surfactant, a nonionic surfactant, and an amphoteric surfactant may be used.

Examples of the anionic surfactant include: sodium oleate; fatty acid oil such as potassium castorate; alkyl sulfate ester salt such as sodium lauryl sulfate and ammonium lauryl sulfate; alkyl benzene sulfonate such as sodium dodecyl benzene sulfonate; alkyl naphthalene sulfonate; alkane sulfonate; dialkyl sulfosuccinate such as sodium dioctyl sulfosuccinate; alkenyl succinate (dipotassium salt); alkyl phosphate ester salt; naphthalene sulfonate formaldehyde condensate; polyoxyethylene alkyl ether sulfate such as polyoxyethylene alkyl phenyl ether sulfate ester salt and sodium polyoxyethylene lauryl ether sulfate; polyoxyethylene alkyl sulfate ester salt; and the like.

Examples of the nonionic surfactant include polyoxyethylene alkyl ether, polyoxyethylene alkylphenyl ether, polyoxyethylene fatty acid ester, sorbitan fatty acid ester, polyoxysorbitan fatty acid ester, polyoxyethylene alkylamine, glycerin fatty acid ester, oxyethylene-oxypropylene block polymer, and the like.

Examples of the cationic surfactant include: alkylamine salt such as lauryl amine acetate and stearyl amine acetate; quaternary ammonium salt such as lauryl trimethylammonium chloride; and the like.

Examples of the amphoteric surfactant include lauryl dimethylamine oxide, phosphate surfactants, phosphite surfactants, and the like.

The surfactants described above may be used alone or in a combination of two or more. The type of surfactant and the amount of surfactant used may be adjusted as appropriate considering the dispersion stability and the like of the monomer mixture during the suspension-polymerization.

The polymerization temperature of the monomer mixture is preferably 40° C. to (organic solvent boiling point T−5° C.). The polymerization temperature is preferably kept for 0.1 to 20 hours. After the polymerization is completed, a suspension (slurry) in which the organic solvent is contained in the porous resin particles is obtained. Note that the organic solvent contained in the suspension is removed in a distillation step (described later).

Note that, in the polymerization step, if the suspension-polymerization is performed by dispersing droplets of the oil phase containing the monomer mixture into the aqueous phase, using a high-pressure disperser or the like such as a microfluidizer or a nanomizer utilizing collision between droplets or collision force against the machine wall, porous resin particles having a uniform particle size can be manufactured.

—Distillation Step—

In the distillation step, the suspension containing the porous resin particles obtained in the polymerization step is distilled, and, thus, the organic solvent is removed from the suspension.

In the distillation step, the distillation is performed, for example, by placing the suspension containing the porous resin particles obtained in the polymerization step in a distillatory, with stirring at a temperature and a pressure where at least the organic solvent can be distilled. In this case, the distillation is preferably performed at the same time when the suspension is placed in the distillatory. Accordingly, the suspension may be supplied, for example, using a liquid supply pump or a negative pressure inside the distillatory, to the distillatory that has been adjusted in advance to have a temperature and/or a pressure where the organic solvent can be evaporated off under reduced pressure. At that time, the suspension may be continuously supplied to the distillatory while adjusting the amount of suspension supplied such that the amount of organic solvent contained in the suspension that is to be supplied and the amount of distillate obtained by the distillation are kept balanced, or the suspension may be intermittently supplied to the distillatory by successively performing supply and stop of the supply.

The conditions for performing the distillation vary depending on the type of organic solvent used in the polymerization step. Typically, it is preferable that the distillation is performed at a temperature not lower than the boiling point of the organic solvent, under a reduced pressure of 0.030 MPa or less.

With this distillation step, the organic solvent is removed from the suspension. At the same time, the polymerization initiator and a residue of this polymerization initiator contained in the suspension, and unreacted monomers (specifically, the methyl methacrylate and the (meth)acrylic-based cross-linkable monomer) remaining in the suspension may be removed.

—Decomposition and Removal Step—

The method of manufacturing porous resin particles of the present invention preferably includes, after the distillation step and before a drying step (described later), a decomposition and removal step of decomposing and removing the inorganic dispersion stabilizer contained in the suspension. For example, if a substance that decomposes with acid and dissolves in water is used as the inorganic dispersion stabilizer, the decomposition and removal of the inorganic dispersion stabilizer can be performed by adding acid to the suspension from which the organic solvent has been removed in the distillation step, thereby decomposing the inorganic dispersant and dissolving the inorganic dispersant in the suspension, filtering the suspension so as to collect porous resin particles therefrom, and washing with water the porous resin particles collected by filtering.

With this decomposition and removal step, the amount of residual metal derived from the inorganic dispersion stabilizer contained in the porous resin particles manufactured using the method of manufacturing porous resin particles of the present invention can be reduced. Specifically, the amount of residual metal derived from the inorganic dispersion stabilizer can be reduced to 100 ppm or less. The porous resin particles manufactured using the manufacturing method having such a decomposition and removal step are particles in which the amount of residual metal derived from the inorganic dispersion stabilizer is small, and, thus, when the porous resin particles are mixed with the base material resin and the mixture is subjected to extrusion molding, the porous resin particles are unlikely to cause molding failure such as forming die buildup or turning the color of the base material resin (turning the color to yellow).

—Drying Step—

In the drying step after the distillation step, the porous resin particles collected by filtering from the suspension are dried under a reduced pressure of 0.015 MPa or less, preferably 0.010 MPa or less, at a temperature of 80° C. or more, preferably 90° C. or more, for 12 hours or more, preferably 15 hours or more.

With this drying step, the polymerization initiator and a residue of this polymerization initiator contained in the porous resin particles, and monomers (specifically, the methyl methacrylate and the (meth)acrylic-based cross-linkable monomer) remaining in the porous resin particles are further reduced. Specifically, the amount of polymerization initiator and residue of this polymerization initiator remaining in the porous resin particles is reduced to 50 ppm or less, and the amount of unreacted methyl methacrylate remaining in the porous resin particles is reduced to 20 ppm or less.

External Preparation

The external preparation of the present invention contains the porous resin particles of the present invention. Since the external preparation of the present invention contains the porous resin particles of the present invention having a sufficient porosity that allows light diffusing properties to be exhibited, when being applied to the skin, the external preparation is excellent in the soft focusing properties that can diminish the appearance of skin pores, dark spots, wrinkles, and the like, through the light diffusing effect.

The amount of porous resin particles contained in the external preparation of the present invention may be set as appropriate according to the type of external preparation, but the amount is preferably 1 to 80% by weight, more preferably 3 to 70% by weight. If the amount of porous resin particles contained with respect to the total amount of external preparation is less than 1% by weight, clear effects of the porous resin particles may not be seen. Furthermore, if the amount of porous resin particles contained is more than 80% by weight, remarkable effects corresponding to an increase in the amount of porous resin particles contained may not be seen, which is not preferable in terms of production cost.

The external preparation of the present invention can be used, for example, as external medicines cosmetic materials or the like. There is no particular limitation on the external medicines, as long as they are applied to the skin. Specific examples thereof include cream, ointment, emulsion, and the like. Examples of the cosmetic materials include: cleansing cosmetics such as soap, body shampoo, facial cleaning cream, scrub face cleaner, and tooth paste; make-up cosmetic materials such as face-whitening makeup, face powders (loose powder, pressed powder, etc.), foundation (powder foundation, liquid foundation, emulsion-type foundation, etc.), lipstick, lip balm, blush, cosmetic for eyes and eyebrows (eye shadow, eye liner, mascara, etc.), and nail polish; lotions such as pre-shave lotion and body lotion; external preparations for body such as body powder and baby powder; skin care products such as skin lotion, cream, and milky lotion (cosmetic milky lotion); antiperspirants (liquid antiperspirant, solid antiperspirant, cream antiperspirant, etc.); packs; hair-washing cosmetics; hair color; hairdressing agents; perfume cosmetics; bath agents; sunscreen agents; sun tanning agents; shaving creams; and the like.

The porous resin particles mixed into the external preparation of the present invention may be treated with oil, surface treatment agent such as silicone compound or fluorine compound, organic powder, inorganic powder, or the like.

The oil may be any material, as long as it is commonly used in external preparations. Examples thereof include: hydrocarbon oil such as liquid paraffin, squalane, Vaseline, and paraffin wax; higher fatty acid such as lauric acid, myristic acid, palmitic acid, stearic acid, oleic acid, behenic acid, undecylenic acid, oxystearic acid, linoleic acid, lanolin fatty acid, and synthetic fatty acid; ester oil such as glyceryl trioctanoate, propylene glycol dicaprate, cetyl 2-ethylhexanoate, and isocetyl stearate; waxes such as beeswax, spermaceti, lanolin, carnauba wax, and candelilla wax; fats and oils such as linseed oil, cottonseed oil, castor oil, egg-yolk oil, and coconut oil; metal soap such as zinc stearate and zinc laurate; higher alcohol such as cetyl alcohol, stearyl alcohol, oleyl alcohol; and the like. Furthermore, there is no particular limitation on the method of treating the porous resin particles with the oil, and examples thereof include a dry method in which oil is added to the porous resin particles, and the mixture is stirred using a mixer or the like, so that the porous resin particles are coated with the oil; a wet method in which oil is dissolved with the application of heat in appropriate solvent material such as ethanol, propanol, ethyl acetate, and hexane, and the porous resin particles are added to the solvent material and mixed with stirring, after which the solvent material is removed under reduced pressure or with the application of heat, so that the porous resin particles are coated with the oil; and the like.

The silicone compound may be any material, as long as it is commonly used in external preparations. Examples thereof include: dimethylpolysiloxane, methylhydrogenpolysiloxane, methylphenylpolysiloxane, acryl-silicone graft polymer, organic silicone resin partially cross-linking organopolysiloxane polymer, and the like. There is no particular limitation on the method of treating the porous resin particles with the silicone compound, and examples thereof include the dry method and the wet method described above. Furthermore, firing treatment may be performed as necessary, and, in the case of a reactive silicone compound, a catalyst or the like may be added as appropriate.

The fluorine compound may be any material, as long as it is commonly mixed into external preparations. Examples thereof include perfluoroalkyl group-containing ester, perfluoroalkylsilane, perfluoropolyether, perfluoro group-containing polymer, and the like. There is no particular limitation on the method of treating the porous resin particles with the fluorine compound, and examples thereof include the dry method and the wet method described above. Furthermore, firing treatment may be performed as necessary, and, in the case of a reactive fluorine compound, a catalyst or the like may be added as appropriate.

Examples of the organic powder include: natural macromolecular compounds such as gum arabic, gum tragacanth, guar gum, locust bean gum, karaya gum, Irish moss, Quince seed, gelatin, shellac, rosin, and casein; semisynthetic macromolecular compounds such as sodium carboxymethylcellulose, hydroxyethylcellulose, methylcellulose, ethylcellulose, sodium alginate, gum ester, nitrocellulose, hydroxypropylcellulose, and crystalline cellulose; polyvinyl alcohol, polyvinylpyrrolidone, sodium polyacrylate, carboxyvinyl polymer, polyvinyl methyl ether, polyamide resin, silicone oil, nylon particles, poly(methyl methacrylate) particles, cross-linked polystyrene particles, silicone particles, urethane particles, polyethylene particles, fluoro resin particles, and other resin particles. Furthermore, examples of the inorganic powder include iron oxide, ultramarine, iron blue, chromium oxide, chromium hydroxide, carbon black, manganese violet, titanium oxide, zinc oxide, talc; kaolin, mica, calcium carbonate, magnesium carbonate, isinglass, aluminum silicate, barium silicate, calcium silicate, magnesium silicate, silica, zeolite, barium sulfate, calcined calcium sulfate (calcined gypsum), calcium phosphate, hydroxyapatite, ceramic powder, and the like. Furthermore, these organic powders and inorganic powders may be subjected to surface treatment in advance. Examples of the surface treatment method include known surface treatment techniques described above.

Furthermore, commonly used main agents or additives may be mixed as necessary into the external preparation of the present invention within a range not impairing the effects of the present invention. Examples of the main agents or additives include water, lower alcohol (alcohol having 5 or less carbon atoms), fats and oils and waxes, hydrocarbon, higher fatty acid, higher alcohol, sterol, fatty acid ester, metal soap, moisturizing agents, surfactants, macromolecular compounds, ingredients of color materials, flavoring substance, clay minerals, antiseptics and germicides, anti-inflammatory agents, antioxidants, ultraviolet absorber, organic and inorganic composite particles, pH control agents (triethanolamine, etc.), specially mixed additives, pharmaceutical active substances and the like.

Specific examples of the fats and oils and waxes include avocado oil, almond oil, olive oil, cacao butter, beef tallow, sesame oil, wheat germ oil, safflower oil, shea butter, turtle oil, camellia oil, persic oil, castor oil, grape seed oil, macadamia nut oil, mink oil, egg-yolk oil, Japan wax, coconut oil, rose hip oil, hardened oil, silicone oil, orange roughy oil, carnauba wax, candelilla wax, spermaceti, jojoba oil, montan wax, beeswax, lanolin, and the like.

Specific examples of the hydrocarbon include liquid paraffin, Vaseline, paraffin, ceresin, microcrystalline wax, squalane, and the like.

Specific examples of the higher fatty acid include fatty acid having 11 or more carbon atoms, such as lauric acid, myristic acid, palmitic acid, stearic acid, oleic acid, behenic acid, undecylenic acid, oxystearic acid, linoleic acid, lanolin fatty acid, and synthetic fatty acid.

Specific examples of the higher alcohol include alcohol having 6 or more carbon atoms, such as lauryl alcohol, cetyl alcohol, cetostearyl alcohol, stearyl alcohol, oleyl alcohol, behenyl alcohol, lanolin alcohol, hydrogenated lanolin alcohol, hexyldecanol, octyldecanol, isostearyl alcohol, jojoba alcohol, and decyltetradecanol.

Specific examples of the sterol include cholesterol, dihydrocholesterol, and phytocholesterol, and the like.

Specific examples of the fatty acid ester include: linoleic acid ester such as ethyl linoleate; lanolin fatty acid ester such as isopropyl lanolate; lauric acid ester such as hexyl laurate; myristic acid ester such as isopropyl myristate, myristyl myristate, cetyl myristate, octyldecyl myristate, and octyldodecyl myristate; oleic acid ester such as decyl oleate and octyldodecyl oleate; dimethyl octanoic acid ester such as hexyldecyl dimethyloctanoate; isooctanoic acid ester such as cetyl isooctanoate (cetyl 2-ethylhexanoate); palmitic acid ester such as decyl palmitate; cyclic alcohol fatty acid ester such as glycerin trimyristate, glycerin tri(capryl caprate), propylene glycol dioleate, glycerin triisostearate, glycerin triisooctanoate, cetyl lactate, myristyl lactate, diisostearyl malate, cholesteryl isostearate, and cholesteryl 12-hydroxystearate; and the like.

Specific examples of the metal soap include zinc laurate, zinc myristate, magnesium myristate, zinc palmitate, zinc stearate, aluminum stearate, calcium stearate, magnesium stearate, zinc undecylenate, and the like.

Specific examples of the moisturizing agents include glycerin, propylene glycol, 1,3-butylene glycol, polyethylene glycol, sodium dl-pyrrolidonecarboxylate, sodium lactate, sorbitol, sodium hyaluronate, polyglycerin, xylitol, maltitol, and the like.

Specific examples of the surfactants include: anionic surfactants such as higher fatty acid soap, higher alcohol sulfuric acid ester, N-acyl glutamic acid salt, and phosphate ester salt; cationic surfactants such as amine salt and quaternary ammonium salt; amphoteric surfactants such as betaine-type, amino acid-type, and imidazoline-type surfactants, and lecithin; and nonionic surfactants such as fatty acid monoglyceride, polyethylene glycol, propylene glycol fatty acid ester, sorbitan fatty acid ester (e.g., sorbitan isostearate, etc.), sucrose fatty acid ester, polyglycerin fatty acid ester, and ethylene oxide condensate; and the like.

Specific examples of the macromolecular compounds include: natural macromolecular compounds such as gum arabic, gum tragacanth, guar gum, locust bean gum, karaya gum, Irish moss, Quince seed, gelatin, shellac, rosin, and casein; semisynthetic macromolecular compounds such as sodium carboxymethylcellulose, hydroxyethylcellulose, methylcellulose, ethylcellulose, sodium alginate, gum ester, nitrocellulose, hydroxypropylcellulose, and crystalline cellulose; and synthetic macromolecular compounds such as polyvinyl alcohol, polyvinylpyrrolidone, sodium polyacrylate, carboxyvinyl polymer, polyvinyl methyl ether, polyamide resin, silicone oil, nylon particles, poly(meth)acrylic acid ester particles (e.g., poly(methyl methacrylate) particles, etc.), polystyrene particles, silicone-based particles, urethane particles, polyethylene particles, silica particles, and other resin particles.

Specific examples of the ingredients of color materials include: inorganic pigments such as iron oxide (red iron oxide, yellow iron oxide, black iron oxide, etc.), ultramarine, iron blue, chromium oxide, chromium hydroxide, carbon black, manganese violet, titanium oxide, zinc oxide, talc, kaolin, calcium carbonate, magnesium carbonate, isinglass, aluminum silicate, barium silicate, calcium silicate, magnesium silicate, silica, zeolite, barium sulfate, calcined calcium sulfate (calcined gypsum), calcium phosphate, hydroxyapatite, and ceramic powder; and tar dyes such as azo-based, nitro-based, nitroso-based, xanthene-based, quinoline-based, anthraquinoline-based, indigo-based, triphenylmethane-based, phthalocyanine-based, and pyrene-based dyes.

Note that the ingredient powders of macromolecular compounds, color materials, and the like may be subjected to surface treatment in advance. Known techniques of surface treatment may be used as a method for performing the surface treatment. Examples thereof include: treatment with oil such as hydrocarbon oil, ester oil, or lanolin; treatment with silicone such as dimethylpolysiloxane, methylhydrogenpolysiloxane, or methylphenylpolysiloxane; treatment with fluorine compound such as perfluoroalkyl group-containing ester, perfluoroalkylsilane, perfluoropolyether, or perfluoroalkyl group-containing polymer; treatment with silane coupling agent such as 3-methacryloxypropyltrimethoxysilane or 3-glycidoxypropyltrimethoxysilane; treatment with titanium coupling agent such as isopropyltriisostearoyl titanate or isopropyl tris(dioctylpyrophosphate)titanate; treatment with metal soap; treatment with amino acid such as acyl glutamic acid; treatment with lecithin such as hydrogenated egg-yolk lecithin; treatment with collagen; treatment with polyethylene; moisturizing treatment; treatment with inorganic compound; and mechanochemical treatment.

Specific examples of the clay minerals include components that have several functions of extender pigment, absorbent, and the like, such as talc, mica, sericite, titanium sericite (sericite coated with titanium oxide), white mica, and Veegum (registered trademark) manufactured by Vanderbilt.

Specific examples of the flavoring substance include anisaldehyde, benzyl acetate, geraniol, and the like. Specific examples of the antiseptics and germicides include methylparapen, ethylparapen, propylparapen, benzalkonium, benzethonium, and the like. Specific examples of the antioxidants include dibutylhydroxytoluene, butylhydroxyanisole, propyl gallate, tocopherol, and the like. Specific examples of the ultraviolet absorber include: inorganic absorbers such as titanium oxide fine particles, zinc oxide fine particles, cerium oxide fine particles, iron oxide fine particles, and zirconium oxide fine particles; and organic absorbers such as benzoic acid-based, para-aminobenzoic acid-based, anthranilic acid-based, salicylic acid-based, cinnamic acid-based, benzophenone-based, and dibenzoylmethane-based absorbers.

Specific examples of the specially mixed additives include: hormones such as estradiol, estrone, ethinylestradiol, cortisone, hydrocortisone, and prednisone; vitamins such as vitamin A, vitamin B, vitamin C, and vitamin E; skin astringents such as citric acid, tartaric acid, lactic acid, aluminum chloride, aluminum potassium sulfate, allantoin chlorohydroxy aluminum, zinc para-phenolsulfonate, and zinc sulfate; trichogenous accelerants such as cantharides tincture, capsicum tincture, ginger tincture, swertia extract, garlic extract, hinokitiol, carpronium chloride, glyceride pentadecanate, vitamin E, estrogen, and photosensitive elements; whitening agents such as magnesium L-ascorbyl-phosphate and kojic acid; and the like.

Coating Agent

The porous resin particles of the present invention may be contained as a coating film softening agent, a matting agent for coating materials, a light diffusion agent, or the like in a coating agent. The coating agent of the present invention contains the porous resin particles of the present invention.

The coating agent contains a binder resin as necessary. The binder resin may be a resin that is soluble in organic solvent or water, or an emulsion-type aqueous resin that can be dispersed in water, and any known binder resin may be used as the binder resin. Examples of the binder resin include: acrylic-based resins such as brand name "Dianal (registered trademark) LR-102" and "Dianal (registered trademark) BR-106" manufactured by Mitsubishi Rayon Co., Ltd., and brand name "Medium VM (K)" manufactured by Dainichiseika Color & Chemicals Mfg. Co., Ltd.; alkyd resins; polyester resins; polyurethane resins; chlorinated polyolefin resins; amorphous polyolefin resins, and the like. These binder resins may be selected as appropriate based on the coating adhesiveness when being applied to the base material, the environment of use, and the like.

The amount of porous resin particles contained is adjusted as appropriate based on the thickness of a coating film formed by the coating agent containing the binder resin, the average particle size of the porous resin particles, the application method, the application of use, and the like. The amount thereof is preferably 1 to 300 parts by weight with respect to 100 parts by weight of the binder resin. Furthermore, the amount is more preferably 5 to 50% by weight, even more preferably 8 to 40% by weight, with respect to the total amount of the binder resin (the solid content when using an emulsion-type aqueous resin) and the porous resin particles. If the amount of porous resin particles contained is less than 5% by weight, sufficient matting effect may not be obtained. On the other hand, if the amount of porous resin particles contained is more than 50% by weight, the viscosity of the coating agent becomes too large, and, thus, dispersion failure of the porous resin particles may occur. Thus, the appearance may be defective, such as microcrack occurring on the surface of a coating film obtained by the application of the coating agent, or the surface of the obtained coating film becoming rough.

The coating agent contains a medium as necessary. As the medium, solvent (solvent material) in which the binder resin can be dissolved or dispersion medium in which the binder resin can be dispersed may be preferably used. As the dispersion medium or the solvent material, both a water-based medium and an oil-based medium may be used. Examples of the oil-based medium include: hydrocarbon-based solvent such as toluene and xylene; ketone-based solvent such as methyl ethyl ketone and methyl isobutyl ketone; ester-based solvent such as ethyl acetate and butyl acetate; and ether-based solvent such as dioxane, ethylene glycol diethyl ether, ethylene glycol monobutyl ether; and the like. Examples of the water-based medium include water, alcohols (e.g., isopropanol), and the like. These types of solvent may be used alone or in a combination as a mixture of two or more. The amount of medium contained in the coating agent is typically 20 to 60% by weight with respect to the total amount of the coating agent.

Moreover, the coating agent may further contain other additives such as curing agents, coloring agents (extender pigments, coloring pigments, metal pigments, mica powder pigments, dyes, etc.), antistatic agents, leveling agents, flow control agent, ultraviolet absorbers, or light stabilizers.

There is no particular limitation on the base material to which the coating agent is to be applied, and base materials can be used as appropriate according to the use.

For example, in optical applications, glass base materials and transparent base materials made of transparent base material resin or the like may be used as the base material to which the coating agent is to be applied. If a transparent base material is used as the base material to which the coating agent is to be applied, and a transparent coating film is formed thereon by the application of a coating agent (coating agent for light diffusion) containing no coloring agent, optical films such as light diffusion films or glare-proof films can be manufactured. In this case, the porous resin particles function as a light diffusion agent.

Furthermore, if paper is used as the base material to which the coating agent is to be applied, and a transparent coating film is formed thereon by the application of a coating agent (coating agent for paper) containing no coloring agent, mat paper can be manufactured.

There is no particular limitation on the method of applying the coating agent, and any known method may be used. Examples of the application method include spray application method, roll application method, brush application method, and the like. The coating agent may be diluted with diluent as necessary in order to adjust the viscosity. Examples of the diluent include: hydrocarbon-based solvents such as toluene and xylene; ketone-based solvents such as methyl ethyl ketone and methyl isobutyl ketone; ester-based solvents such as ethyl acetate and butyl acetate; ether-based solvents such as dioxane and ethylene glycol diethyl ether; water; alcohol-based solvents; and the like. These types of diluent may be used alone or in a combination as a mixture of two or more. When manufacturing an optical film, the application method is preferably such that roughness resulting from the porous resin particles appears on the surface of the coating film.

Optical Film

The optical film of the present invention is formed by applying the coating agent of the present invention to a base material. Specific examples of the optical film include light diffusion films, glare-proof films, and the like.

Specific examples of the base material of the optical film include glass base materials, transparent base materials made of transparent base material resin, and the like.

Examples of the transparent base material resin include acrylic resin, alkyl(meth)acrylate-styrene copolymer, polycarbonate, polyester such as polyethylene terephthalate (hereinafter, abbreviated as "PET"), polyethylene, polypropylene, polystyrene, and the like. Of these transparent base material resins, if there is a demand for a transparent base material resin having excellent transparency, acrylic resin, alkyl(meth)acrylate-styrene copolymer, polycarbonate, polyester, and polystyrene are preferable. These transparent base material resins may be used alone or in a combination as a mixture of two or more.

Resin Composition

The resin composition of the present invention contains the porous resin particles of the present invention and a base material resin. The resin particle composition of the present invention contains the porous resin particles of the present invention and is excellent in the light diffusing properties, and, thus, it can be used as materials for forming light diffusion members such as illumination covers (illumination covers for light-emitting diode (LED) illumination, illumination covers for fluorescent illumination, etc.), light diffusion sheets, and light diffusion plates.

As the base material resin, typically, a thermoplastic resin that is different from the polymer component forming the porous resin particles is used. Examples of the thermoplastic resin used as the base material resin include acrylic resin, alkyl(meth)acrylate-styrene copolymer, polycarbonate, polyester, polyethylene, polypropylene, polystyrene, and the like. Of these thermoplastic resins, if there is a demand for a base material resin having excellent transparency, acrylic resin, alkyl(meth)acrylate-styrene copolymer, polycarbonate, polyester, and polystyrene are preferable. These thermoplastic resins may be used alone or in a combination as a mixture of two or more.

The proportion of porous resin particles added to the base material resin is preferably 1 to 300 parts by weight, more preferably 10 to 100 parts by weight, with respect to 100 parts by weight of the base material resin. If the proportion of porous resin particles added to the base material resin is less than 1 part by weight with respect to 100 parts by weight of the base material resin, it may be difficult to provide the light diffusion member with light diffusing properties. On the other hand, if the proportion of porous resin particles added to the base material resin is more than 300 parts by weight with respect to 100 parts by weight of the base material resin, the light diffusion member is provided with light diffusing properties, but the optical transparency of the light diffusion member may be low.

There is no particular limitation on the method of manufacturing the resin composition, and it can be manufactured using conventionally known methods such as a method in which the porous resin particles and the base material resin are mechanically pulverized. In the mechanical pulverizing and mixing method, for example, the porous resin particles and the base material resin are mixed and stirred using a Henschel mixer, a V-type mixer, a Turbula mixer, a hybridizer, a rocking mixer, or the like, and, thus, a resin composition can be manufactured.

Molded Body

The molded body of the present invention is formed by molding the resin composition of the present invention. Specific examples of the molded body of the present invention include light diffusion members such as illumination covers (illumination covers for light-emitting diode (LED) illumination, illumination covers for fluorescent illumination, etc.), light diffusion sheets, light diffusion plates, and the like.

For example, the porous resin particles and the base material resin are mixed in a mixer, and kneaded by a melt-kneader such as an extruder, and, thus, pellets made of the resin composition are formed, after which these pellets are extrusion-molded, or these pellets are melted and then injection-molded, and, thus, a molded body having any shape can be obtained.

EXAMPLES

Hereinafter, the present invention will be specifically described by way of examples and comparative examples, but the present invention is not limited to these examples.

First, a method of measuring the volume-average particle size of the resin particles, a method of measuring the specific surface area of the resin particles, a method of measuring the pore size and the pore volume of the resin particles, a method of measuring the amount of unreacted methyl methacrylate remaining in the resin particles (the amount of residual methyl methacrylate), a method of measuring the amount of polymerization initiator and residue of this polymerization initiator remaining in the resin particles (the amount of polymerization initiator residue), a method of measuring the thermal decomposition starting temperature, and a method of measuring the amount of metal remaining in the resin particles (the amount of residual metal) in examples and comparative examples will be described.

Method of Measuring the Volume-Average Particle Size of the Resin Particles

The volume-average particle size of the resin particles was measured using a Coulter Multisizer III (measuring apparatus manufactured by Beckman Coulter). The measurement was performed using an aperture size (diameter) prescribed in the Multisizer™ 3 user's manual issued by Beckman Coulter.

Note that apertures used for the measurement were selected as appropriate, for example, such that, if an assumed volume-average particle size of the resin particles subjected to the measurement was 1 μm or more and 10 μm or less, an aperture having a size of 50 μm was selected, if an assumed volume-average particle size of the resin particles subjected to the measurement was more than 10 μm and 30 μm or less, an aperture having a size of 100 μm was selected, if an assumed volume-average particle size of the resin particles subjected to the measurement was more than 30 μm and 90 μm or less, an aperture having a size of 280 μm was selected, and if an assumed volume-average particle size of the resin particles subjected to the measurement was more than 90 μm and 150 μm or less, an aperture having a size of 400 μm was selected.

Furthermore, current (aperture current) and gain suitable for the size of the aperture were set according to the Multisizer™ 3 user's manual issued by Beckman Coulter.

As the measurement sample, a dispersion obtained by dispersing 0.1 g of resin particles in 10 ml of 0.1 wt % nonionic surfactant using a touch mixer ("TOUCHMIXER Mt-31" manufactured by Yamato Scientific Co., Ltd.) and an ultrasonic cleaner ("ULTRASONIC CLEANER VS-150" manufactured by Velvo-Clear) was used. A beaker filed with ISOTON (registered trademark) II (measurement electrolyte manufactured by Beckman Coulter) was set in a measurement unit of a Coulter Multisizer III, the dispersion was added dropwise to the beaker with gentle stirring, and a value indicated by a concentration meter on the screen of the Coulter Multisizer III main body was adjusted to 5 to 10%, after which the measurement was started. During the measurement, the content of the beaker was gently stirred such that air pockets were not entrapped therein, and the measurement was ended when a hundred thousand particles had been measured.

The volume-average particle size is an arithmetic mean in the volume-based particle size distribution of the hundred thousand particles.

The coefficient of variation (CV) in the particle size of the resin particles is calculated using the equation below.

Coefficient of variation in particle size of resin particles=(Standard deviation of volume-based particle size distribution of resin particles/Volume-average particle size of resin particles)×100

Method of Measuring the Specific Surface Area of the Resin Particles

The specific surface area of the resin particles was measured using the BET method (nitrogen adsorption method) as defined in ISO 9277, first edition, JIS Z 8830: 2001. A BET nitrogen adsorption isotherm of the resin particles as a measurement target was measured using a micromeritics automatic surface area and porosimetry analyzer Tristar 3000 manufactured by Shimadzu Corporation, and the specific surface area was calculated from the nitrogen adsorption amount using the BET multi-point method. After pretreatment was performed with hot gas purge, the measurement was performed according to the constant volume method using nitrogen as adsorbate at an adsorbate cross-sectional area of 0.162 $nm^2$. Specifically, the pretreatment was performed by performing nitrogen purge for 20 minutes while heating a vessel containing the resin particles at 65° C., allowing the vessel to cool at room temperature, and then performing vacuum degassing until the pressure inside the vessel reached 0.05 mmHg or less while heating the vessel at 65° C.

Method of Measuring the Pore Size and the Pare Volume of the Resin Particles

The pore size (average pore size) and the pore volume of the resin particles were obtained using the BJH method. A nitrogen desorption isotherm of the resin particles as a measurement target was measured using a micromeritics automatic surface area and porosimetry analyzer Tristar 3000 manufactured by Shimadzu Corporation, and the pore size (average pore size) and the pore volume (total pore volume) were calculated using the BJH method. Note that the nitrogen desorption isotherm was measured according to the constant volume method using nitrogen as adsorbate at an adsorbate cross-sectional area of 0.162 $nm^2$.

Method of Measuring the Amount of Residual Methyl Methacrylate (1) Preparation of the Sample Liquid First, 1 g of resin particles as a measurement target, 25 ml of carbon disulfide, and 1 ml of internal standard fluid were placed in a test tube. Subsequently, extraction was performed at room temperature for 12 hours. Then, 1.8 μl of obtained extraction liquid was collected and injected. Note that the internal standard fluid was obtained by adding 0.1 ml of toluene to 75 ml of carbon disulfide.

(2) Measurement of the Amount of Residual Methyl Methacrylate

The measurement on the sample liquid was performed using a gas chromatograph (brand name "GC-14A" manufactured by Shimadzu Corporation) following the measurement conditions described below, and the amount of methyl methacrylate was quantified using the internal standard method.

<Measurement Conditions>
Column filler: Liquid phase PEG-20M
Carrier Chromosorb W
Column size: 3 mm (I.D.)×3000 mm (L)
Detector: FID (flame ionization detector)
Carrier gas: nitrogen, air, helium
Carrier gas flow rate: 30 ml/min (nitrogen), 300 ml/min (air), 35 ml/min (helium.)
Column temperature: 105° C.
Injection opening temperature: 110° C.

Method of Measuring the Amount of Polymerization Initiator Residue

The amount of polymerization initiator residue can be measured using known methods according to the polymerization initiator used to manufacture the resin particles as a measurement target. In examples and comparative examples described later, lauroyl peroxide, 2,2'-azobis(2,4 dimethylvaleronitrile), or azobisisobutyronitrile was used as the polymerization initiator, and, thus, the methods of measuring the residual amount of lauroyl peroxide, 2,2'-azobis(2,4 dimethylvaleronitrile), and azobisisobutyronitrile will be described below.

—Method of Measuring the Residual Amount of Lauroyl Peroxide—

(1) Preparation of the Sample Liquid

First, 0.15 g of resin particles as a measurement target and 5 ml of methanol were placed in a test tube. Subsequently, mixing and extraction were performed using an ultrasonic cleaner for 15 minutes. Then, the obtained extraction liquid was subjected to centrifugal separation, the supernatant liquid was filtered through a non-aqueous chromatography disc having a pore size of 0.25 μm, and, thus, a sample liquid was obtained.

(2) Measurement of the Amount of Lauroyl Peroxide

The measurement on the sample liquid was performed using an ultra high-speed liquid chromatograph (manufactured by Hitachi High-Technologies Corporation, brand name "LaChromUltra") following the measurement conditions described below, and the amount of lauroyl peroxide was quantified using the absolute calibration method.

<Measurement Conditions>
Column: LaChromUltra C18 (manufactured by Hitachi High-Technologies Corporation, particle size: 2 μm, column size: 2.0 mm (I.D.)×50 mm (L))
Column temperature: 40° C.
Solvent material: acetonitrile
Flow speed: 0.6 ml/min
Injection amount: 4 μl
Injection temperature: room temperature (25° C.)

—Method of Measuring the Residual Amount of 2,2'-Azobis(2,4 Dimethylvaleronitrile)—

(1) Preparation of the Sample Liquid

First, 0.1 g of resin particles as a measurement target and 5 ml of methanol were placed in a test tube. Subsequently, mixing and extraction were performed using an ultrasonic cleaner for 15 minutes. Then, the obtained extraction liquid was subjected to centrifugal separation. The supernatant liquid after the centrifugal separation was placed in a 2 ml volumetric flask containing 20 μl of internal standard fluid (p-dichlorobenzene), thereby adjusting the total volume to 2 ml. The liquid with the adjusted volume was taken as a sample liquid.

(2) Measurement of the Residual Amount of 2,2'-Azobis(2,4 Dimethylvaleronitrile)

The measurement on the sample liquid was performed using a gas chromatograph mass spectrometer (brand name "QP-5050A" manufactured by Shimadzu Corporation, gas chromatograph GC-17A manufactured by Shimadzu Corporation) following the measurement conditions described below, and the amount of 2,2'-azobis(2,4 dimethylvaleronitrile) was quantified using the internal standard method.

<Measurement Conditions>
Column: ZB-5MS (manufactured by Phenomenex, film thickness: 0.25 μm, column size: 0.25 mm (I.D.)×30 m)
Column temperature: kept at 45° C. for 3 minutes, and then increased at a programming rate of 5° C./rain to 160° C.
Carrier gas: helium
Carrier flow rate: 1.3 ml/min
Injection temperature: 130° C.
Interface temperature: 250° C.
Detector voltage: 1.25 kV
Measurement mode: SIM (M/Z=68, 69, 111, 150, 152)
Injection amount: 1 μl —Method of Measuring the Residual Amount of Azobisisobutyronitrile—

(1) Preparation of the Sample Liquid

First, 0.1 g of resin particles as a measurement target and 5 ml of methanol were placed in a test tube. Subsequently, mixing and extraction were performed using an ultrasonic cleaner for 15 minutes. The obtained extraction liquid was subjected to centrifugal separation. The supernatant liquid after the centrifugal separation was placed in a 2 ml volumetric flask containing 20 μl of internal standard fluid (toluene), thereby adjusting the total volume to 2 ml. The liquid with the adjusted volume was taken as a sample liquid.

(2) Measurement of the Amount of Azobisisobutyronitrile

The measurement on the sample liquid was performed using a gas chromatograph mass spectrometer (brand name "QP-5050A" manufactured by Shimadzu Corporation, gas chromatograph GC-17A manufactured by Shimadzu Corporation) following the measurement conditions described below, and the amount of azobisisobutyronitrile was quantified using the internal standard method.

<Measurement Conditions>
Column: DB-5 (manufactured by J&W, film thickness: 0.25 μm, column size: 0.25 mm (I.D.)×30 m)
Column temperature: kept at 40° C. for 3 minutes, increased at a programming rate of 10° C./min to 100° C., and then increased at a programming rate of 25° C./min to 250° C.
Carrier gas: helium
Carrier flow rate: 1.4 ml/min
Injection temperature: 120° C.
Interface temperature: 250° C.
Detector voltage: 1.25 kV
Measurement mode: SIM (M/Z=68, 69, 98, 100)
Injection amount: 2 μl Method of Measuring the Thermal Decomposition Starting Temperature The thermal decomposition starting temperature of the resin particles was measured using a TG/DTA apparatus (TG/DTA6200 manufactured by Seiko Instruments Inc.).

That is to say, the weight loss behavior within a temperature range of 40 to 500° C. was measured using the above-described TG/DTA apparatus, in an air atmosphere, at an air flow rate of 200 ml/min, and at a programming rate of 20° C./min (temperature range 40 to 100° C.) or at a programming rate of 10° C./min (temperature range 100 to 500° C.). The intersection of the extension of the base line (horizontal portion) of the weight loss curve obtained by this measurement and the tangent (tangent at the maximum slope) of the mass loss portion (downward-sloping hatched portion) was taken as the thermal decomposition starting temperature of the resin particles.

Method of Measuring the Amount of Residual Metal

The amount of residual metal element contained in the resin particles was measured using a multi-type ICP emission spectrometer ("ICPE-9000" manufactured by Shimadzu Corporation).

Specifically, about 1.0 g of resin particles was precisely weighed, and, the precisely weighed resin particles were incinerated with the application of heat using an electric furnace (muffle furnace STR-15K manufactured by Isuzu Manufacturing Co., Ltd.) at 450° C. for 3 hours. The incinerated resin particles were dissolved in 2 ml of concentrated hydrochloric acid, and diluted in a volumetric flask with distilled water to 50 ml, and, thus, a measurement sample was obtained. Then, the measurement on the measurement sample was performed using the multi-type ICP emission spectrometer following the measurement conditions described below, and the wavelength peak strength of each metal element (Na, Ca, Mg, Fe, and Cr) was obtained. Next, from the obtained wavelength peak strength of each metal element (Na, Ca, Mg, Fe, and Cr), the concentration (μg/ml) of each metal element (Na, Ca, Mg, Fe, and Cr) in the measurement sample was obtained based on the calibration curve (or line) for quantification prepared using the calibration curve (or line) preparing method (described below). A total concentration Tc (μg/ml) of the metal elements (Na, Ca, Mg, Fe, and Cr), and a weight W (g) of the precisely weighed resin particles were substituted for the equation below, and, thus, the amount of residual metal in the resin particles was calculated.

Amount of residual metal=(Tc (μg/ml)/W (g))×50 (ml)

<Measurement Conditions>
Measurement wavelength: Na (589.592 nm), Ca (317.933 nm), Mg (285.213 nm), Fe (238.204 nm), Cr (205.552 nm)
Observation direction: axial direction
High-frequency output: 1.20 kW
Carrier flow rate: 0.7 L/min
Plasma flow rate: 10.0 L/min
Auxiliary flow rate: 0.6 L/min
Exposure time: 30 seconds <Calibration Curve (or Line) Preparing Method>

A calibration curve (or line) standard solution ("XSTC-13 (general-purpose mixture standard solution)" manufactured by USA SPEX, mixture of 31 elements (base: 5% $HNO_3$), about 10 mg/l each) was diluted stepwise with distilled water to prepare standard solutions respectively having concentrations of 0 ppm (blank), 0.2 ppm, 1 ppm, 2.5 ppm, and 5 ppm. The measurement on the standard solutions respectively having these concentrations was performed using the multi-type ICP emission spectrometer following the measurement conditions described above, and the wavelength peak strength of each metal element (Na, Ca, Mg, Fe, and Cr) was obtained. The concentrations and the peak strengths of the metal elements (Na, Ca, Mg, Fe, and Cr) were plotted, and an approximate line (straight line or quadric curve) was obtained using the least squares method, and the obtained approximate line was taken as the calibration curve (or line) for quantification.

Example 1

An aqueous phase was obtained by adding 50 g of tricalcium phosphate as the inorganic dispersion stabilizer and 0.05 g of sodium lauryl sulfate as the anionic surfactant to 1000 g of deionized water. Meanwhile, an oil phase was obtained by preparing a mixed liquid of 200 g of methyl methacrylate (50% by weight with respect to the entire monomer mixture), 200 g of ethylene glycol dimethacrylate (50% by weight with respect to the entire monomer mixture) as the (meth)acrylic-based cross-linkable monomer, 500 g of ethyl acetate (boiling point 77° C.) (125 parts by weight with respect to 100 parts by weight of the monomer mixture) as the organic solvent, and 1 g of lauroyl peroxide as the polymerization initiator. The aqueous phase and the oil phase were mixed, droplets of the oil phase were dispersed in the aqueous phase using a disperser (brand name "T.K. Homo Mixer MARK II Model 2.5" manufactured by Primix Corporation) at a rotational speed of 5000 rpm, and, thus, a dispersion was obtained. This dispersion was placed in a polymerization vessel equipped with a stirrer and a thermometer, and the temperature was increased to 70° C. while performing nitrogen purge with stirring, so that suspension-polymerization was started. The internal temperature was kept at 70° C. for 8 hours, and, thus, a suspension containing resin particles was obtained (polymerization step).

The suspension containing the resin particles was distilled at 80° C. and 0.027 MPa, and, thus, ethyl acetate was removed out of the system (distillation step).

Subsequently, the suspension was cooled down to 20° C., and hydrochloric acid was added to decompose tricalcium phosphate, after which the obtained resin particles were collected by filtering with a Buchner funnel. Then, the resin particles were washed with ion-exchanged water (decomposition and removal step).

The washed resin particles were dried at 90° C., under a reduced pressure of 0.008 MPa, for 24 hours, and, thus, resin particles were obtained (drying step).

The obtained resin particles were resin particles having a large number of pores (porous resin particles), and the volume-average particle size of the obtained resin particles was 10 μm.

Example 2

An aqueous phase was obtained by adding 50 g of tricalcium phosphate as the inorganic dispersion stabilizer and 0.05 g of sodium lauryl sulfate as the anionic surfactant to 1000 g of deionized water. Meanwhile, an oil phase was obtained by preparing a mixed liquid of 200 g of methyl methacrylate (50% by weight with respect to the entire monomer mixture), 200 g of ethylene glycol dimethacrylate (50% by weight with respect to the entire monomer mixture) as the (meth)acrylic-based cross-linkable monomer, 600 g of ethyl acetate (boiling point 77° C.) (150 parts by weight with respect to 100 parts by weight of the monomer mixture) as the organic solvent, and 1 g of azobisisobutyronitrile as the polymerization initiator. The aqueous phase and the oil phase were mixed, droplets of the oil phase were dispersed in the aqueous phase using a disperser (brand name "T.K. Homo Mixer MARK II Model 2.5" manufactured by Primix Corporation) at a rotational speed of 6000 rpm, and, thus, a dispersion was obtained. This dispersion was placed in a polymerization vessel equipped with a stirrer and a thermometer, and the temperature was increased to 70° C. while performing nitrogen purge with stirring, so that suspension-polymerization was started. The internal temperature was kept at 70° C. for 8 hours, and, thus, a suspension containing resin particles was obtained (polymerization step).

The suspension containing the resin particles was distilled at 80° C. and 0.027 MPa, and, thus, ethyl acetate was removed out of the system (distillation step).

Subsequently, the suspension was cooled down to 20° C., and hydrochloric acid was added to decompose tricalcium phosphate, after which the obtained resin particles were collected by filtering with a Buchner funnel. Then, the resin particles were washed with ion-exchanged water (decomposition and removal step).

The washed resin particles were dried at 90° C., under a reduced pressure of 0.008 MPa, for 24 hours, and, thus, resin particles were obtained (drying step).

The obtained resin particles were resin particles having a large number of pores (porous resin particles), and the volume-average particle size of the obtained resin particles was 8 μm.

Example 3

An aqueous phase was obtained by adding 50 g of tricalcium phosphate as the inorganic dispersion stabilizer and 0.05 g of sodium lauryl sulfate as the anionic surfactant to 1000 g of deionized water. Meanwhile, an oil phase was obtained by preparing a mixed liquid of 160 g of methyl methacrylate (40% by weight with respect to the entire monomer mixture), 240 g of ethylene glycol dimethacrylate (60% by weight with respect to the entire monomer mixture) as the (meth)acrylic-based cross-linkable monomer, 700 g of ethyl acetate (boiling point 77° C.) (175 parts by weight with respect to 100 parts by weight of the monomer mixture) as the organic solvent, and 1 g of lauroyl peroxide as the polymerization initiator. The aqueous phase and the oil phase were mixed, droplets of the oil phase were dispersed in the aqueous phase using a disperser (brand name "T.K. Homo Mixer MARK II Model 2.5" manufactured by Primix Corporation) at a rotational speed of 6000 rpm, and, thus, a dispersion was obtained. This dispersion was placed in a polymerization vessel equipped with a stirrer and a thermometer, and the temperature was increased to 70° C. while performing nitrogen purge with stirring, so that suspension-polymerization was started. The internal temperature was kept at 70° C. for 8 hours, and, thus, a suspension containing resin particles was obtained (polymerization step).

The suspension containing the resin particles was distilled at 80° C. and 0.020 MPa, and, thus, ethyl acetate was removed out of the system (distillation step).

Subsequently, the suspension was cooled down to 20° C., and hydrochloric acid was added to decompose tricalcium phosphate, after which the obtained resin particles were collected by filtering with a Buchner funnel. Then, the resin particles were washed with ion-exchanged water (decomposition and removal step).

The washed resin particles were dried at 90° C., under a reduced pressure of 0.008 MPa, for 24 hours, and, thus, resin particles were obtained (drying step).

The obtained resin particles were resin particles having a large number of pores (porous resin particles), and the volume-average particle size of the obtained resin particles was 8 μm.

Example 4

An aqueous phase was obtained by adding 50 g of tricalcium phosphate as the inorganic dispersion stabilizer and 0.05 g of sodium lauryl sulfate as the anionic surfactant to 1000 g of deionized water. Meanwhile, an oil phase was obtained by preparing a mixed liquid of 160 g of methyl methacrylate (40% by weight with respect to the entire monomer mixture), 240 g of ethylene glycol dimethacrylate (60% by weight with respect to the entire monomer mixture) as the (meth)acrylic-based cross-linkable monomer, 4 g of pentaerythritol tetrakis(thioglycolate) as the antioxidant, 700 g of ethyl acetate (boiling point 77° C.) (175 parts by weight with respect to 100 parts by weight of the monomer mixture) as the organic solvent, and 1 g of lauroyl peroxide as the polymerization initiator. The aqueous phase and the oil phase were mixed, droplets of the oil phase were dispersed in the aqueous phase using a disperser (brand name "T.K. Homo Mixer MARK II Model 2.5" manufactured by Primix Corporation) at a rotational speed of 6000 rpm, and, thus, a dispersion was obtained. This dispersion was placed in a polymerization vessel equipped with a stirrer and a thermometer, and the temperature was increased to 70° C. while performing nitrogen purge with stirring, so that suspension-polymerization was started. The internal temperature was kept at 70° C. for 8 hours, and, thus, a suspension containing resin particles was obtained (polymerization step).

The suspension containing the resin particles was distilled at 80° C. and 0.027 MPa, and, thus, ethyl acetate was removed out of the system (distillation step).

Subsequently, the suspension was cooled down to 20° C., and hydrochloric acid was added to decompose tricalcium phosphate, after which the obtained resin particles were collected by filtering with a Buchner funnel. Then, the resin particles were washed with ion-exchanged water (decomposition and removal step).

The washed resin particles were dried at 90° C., under a reduced pressure of 0.008 MPa, for 24 hours, and, thus, resin particles were obtained (drying step).

The obtained resin particles were resin particles having a large number of pores (porous resin particles), and the volume-average particle size of the obtained resin particles was 8 μm.

Example 5

An aqueous phase was obtained by adding 50 g of tricalcium phosphate as the inorganic dispersion stabilizer and 0.05 g of sodium lauryl sulfate as the anionic surfactant to 1000 g of deionized water. Meanwhile, an oil phase was obtained by preparing a mixed liquid of 160 g of methyl methacrylate (40% by weight with respect to the entire monomer mixture), 240 g of ethylene glycol dimethacrylate (60% by weight with respect to the entire monomer mixture) as the (meth)acrylic-based cross-linkable monomer, 700 g of n-hexane (boiling point 69° C.) (175 parts by weight with respect to 100 parts by weight of the monomer mixture) as the organic solvent, and 2 g of 2,2'-azobis(2,4-dimethylvaleronitrile) as the polymerization initiator. The aqueous phase and the oil phase were mixed, droplets of the oil phase were dispersed in the aqueous phase using a disperser (brand name "T.K. Homo Mixer MARK II Model 2.5" manufactured by Primix Corporation) at a rotational speed of 8000 rpm, and, thus, a dispersion was obtained. This dispersion was placed in a polymerization vessel equipped with a stirrer and a thermometer, and the temperature was increased to 60° C. while performing nitrogen purge with stirring, so that suspension-polymerization was started. The internal temperature was kept at 60° C. for 8 hours, and, thus, a suspension containing resin particles was obtained (polymerization step).

The suspension containing the resin particles was distilled at 80° C. and 0.020 MPa, and, thus, n-hexane was removed out of the system (distillation step).

Subsequently, the suspension was cooled down to 20° C., and hydrochloric acid was added to decompose tricalcium phosphate, after which the obtained resin particles were collected by filtering with a Buchner funnel. Then, the resin particles were washed with ion-exchanged water (decomposition and removal step).

The washed resin particles were dried at 90° C., under a reduced pressure of 0.008 MPa, for 24 hours, and, thus, resin particles were obtained (drying step).

The obtained resin particles were resin particles having a large number of pores (porous resin particles), and the volume-average particle size of the obtained resin particles was 5 μm.

Example 6

An aqueous phase was obtained by adding 50 g of tricalcium phosphate as the inorganic dispersion stabilizer and 0.05 g of sodium lauryl sulfate as the anionic surfactant to 1000 g of deionized water. Meanwhile, an oil phase was obtained by preparing a mixed liquid of 80 g of methyl methacrylate (20% by weight with respect to the entire monomer mixture), 320 g of ethylene glycol dimethacrylate (80% by weight with respect to the entire monomer mixture) as the (meth)acrylic-based cross-linkable monomer, 500 g of ethyl acetate (boiling point 77° C.) (125 parts by weight with respect to 100 parts by weight of the monomer mixture) as the organic solvent, and 1 g of lauroyl peroxide as the polymerization initiator. The aqueous phase and the oil phase were mixed, droplets of the oil phase were dispersed in the aqueous phase using a disperser (brand name "T.K. Homo Mixer MARK II Model 2.5" manufactured by Primix Corporation) at a rotational speed of 5000 rpm, and, thus, a dispersion was obtained. This dispersion was placed in a polymerization vessel equipped with a stirrer and a thermometer, and the temperature was increased to 70° C. while performing nitrogen purge with stirring, so that suspension-polymerization was started. The internal temperature was kept at 70° C. for 8 hours, and, thus, a suspension containing resin particles was obtained (polymerization step).

The suspension containing the resin particles was distilled at 80° C. and 0.027 MPa, and, thus, ethyl acetate was removed out of the system (distillation step).

Subsequently, the suspension was cooled down to 20° C., and hydrochloric acid was added to decompose tricalcium phosphate, after which the obtained resin particles were collected by filtering with a Buchner funnel. Then, the resin particles were washed with ion-exchanged water (decomposition and removal step).

The washed resin particles were dried at 90° C., under a reduced pressure of 0.008 MPa, for 24 hours, and, thus, resin particles were obtained (drying step).

The obtained resin particles were resin particles having a large number of pores (porous resin particles), and the volume-average particle size of the obtained resin particles was 9 μm.

Comparative Example 1

An aqueous phase was obtained by adding 50 g of tricalcium phosphate as the inorganic dispersion stabilizer and 0.05 g of sodium lauryl sulfate as the anionic surfactant to 1000 g of deionized water. Meanwhile, an oil phase was obtained by preparing a mixed liquid of 200 g of methyl methacrylate (67% by weight with respect to the entire monomer mixture), 100 g of ethylene glycol dimethacrylate (33% by weight with respect to the entire monomer mixture) as the (meth)acrylic-based cross-linkable monomer, 500 g of ethyl acetate (boiling point 77° C.) (167 parts by weight with respect to 100 parts by weight of the monomer mixture) as the organic solvent, and 1 g of lauroyl peroxide as the polymerization initiator. The aqueous phase and the oil phase were mixed, droplets of the oil phase were dispersed in the aqueous phase using a disperser (brand name "T.K. Homo Mixer MARK II Model 2.5" manufactured by Primix Corporation) at a rotational speed of 5000 rpm, and, thus, a dispersion was obtained. This dispersion was placed in a polymerization vessel equipped with a stirrer and a thermometer, and the temperature was increased to 70° C. while performing nitrogen purge with stirring, so that suspension-polymerization was started. The internal temperature was kept at 70° C. for 8 hours, and, thus, a suspension containing resin particles was obtained (polymerization step).

The suspension containing the resin particles was distilled at 80° C. and 0.027 MPa, and, thus, ethyl acetate was removed out of the system (distillation step).

Subsequently, the suspension was cooled down to 20° C., and hydrochloric acid was added to decompose tricalcium phosphate, after which the obtained resin particles were collected by filtering with a Buchner funnel. Then, the resin particles were washed with ion-exchanged water (decomposition and removal step).

The washed resin particles were dried at 90° C., under a reduced pressure of 0.008 MPa, for 24 hours, and, thus, resin particles were obtained (drying step).

The obtained resin particles were resin particles having a large number of pores (porous resin particles), and the volume-average particle size of the obtained resin particles was 10 µm.

Comparative Example 2

An aqueous phase was obtained by adding 50 g of tricalcium phosphate as the inorganic dispersion stabilizer and 0.05 g of sodium lauryl sulfate as the anionic surfactant to 1000 g of deionized water. Meanwhile, an oil phase was obtained by preparing a mixed liquid of 200 g of methyl methacrylate (50% by weight with respect to the entire monomer mixture), 200 g of ethylene glycol dimethacrylate (50% by weight with respect to the entire monomer mixture) as the (meth)acrylic-based cross-linkable monomer, and 1 g of lauroyl peroxide as the polymerization initiator. The aqueous phase and the oil phase were mixed, droplets of the oil phase were dispersed in the aqueous phase using a disperser (brand name "T.K. Homo Mixer MARK II Model 2.5" manufactured by Primix Corporation) at a rotational speed of 5000 rpm, and, thus, a dispersion was obtained. This dispersion was placed in a polymerization vessel equipped with a stirrer and a thermometer, and the temperature was increased to 70° C. while performing nitrogen purge with stirring, so that suspension-polymerization was started. The internal temperature was kept at 70° C. for 8 hours, and, thus, a suspension containing resin particles was obtained (polymerization step).

Subsequently, the suspension containing the resin particles was cooled down to 20° C., and hydrochloric acid was added to decompose tricalcium phosphate, after which the obtained resin particles were collected by filtering with a Buchner funnel. Then, the resin particles were washed with ion-exchanged water (decomposition and removal step).

The washed resin particles were dried at 90° C., under a reduced pressure of 0.008 MPa, for 24 hours, and, thus, resin particles were obtained (drying step).

The obtained resin particles were dense particles having no pore, and the volume-average particle size of the obtained resin particles was 6 µm.

Table 1 below shows data of the resin particles in Examples 1 to 6 and Comparative Examples 1 and 2, namely the composition of the oil phase, the content of each monomer (the methyl methacrylate and the (meth)acrylic-based cross-linkable monomer) contained in the monomer mixture, the amount of organic solvent used with respect to 100 parts by weight of the monomer mixture, the measurement result of the specific surface area, the measurement result of the pore volume, the measurement result of the average pore size, the measurement result of the thermal decomposition starting temperature, the measurement result of the amount of residual methyl methacrylate, the measurement result of the amount of polymerization initiator residue, and the measurement result of the amount of residual metal. Note that, since the resin particles were manufactured using lauroyl peroxide as the polymerization initiator in Examples 1, 3, 4, and 6 and Comparative Examples 1 and 2, the amount of lauroyl peroxide measured using the above-described "method of measuring the residual amount of lauroyl peroxide" is shown as the amount of polymerization initiator residue in Table 1. Furthermore, since the resin particles were manufactured using azobisisobutyronitrile as the polymerization initiator in Example 2, the amount of azobisisobutyronitrile measured using the above-described "method of measuring the residual amount of azobisisobutyronitrile" is shown as the amount of polymerization initiator residue. Moreover, since the resin particles were manufactured using 2,2'-azobis(2,4 dimethylvaleronitrile) as the polymerization initiator in Example 5, the amount of 2,2'-azobis(2,4 dimethylvaleronitrile) measured using the above-described "method of measuring the residual amount of 2,2'-azobis(2,4 dimethylvaleronitrile)" is shown as the amount of polymerization initiator residue. Furthermore, since the resin particles of Comparative Example 2 were dense particles having no pore, the pore volume and the average pore size of the resin particles of Comparative Example 2 were not measured.

TABLE 1

| | Component | Composition | Ex. 1 | Ex. 2 | Ex. 3 | Ex. 4 | Ex. 5 | Ex. 6 | Com. Ex. 1 | Com. Ex. 2 |
|---|---|---|---|---|---|---|---|---|---|---|
| Oil phase composition (g) | Monomer mixture | Methyl methacrylate | 200 | 200 | 160 | 160 | 160 | 80 | 200 | 200 |
| | | Ethylene glycol dimethacrylate ((meth)acrylic-based cross-linkable monomer) | 200 | 200 | 240 | 240 | 240 | 320 | 100 | 200 |
| | Organic solvent | Ethyl acetate | 500 | 600 | 700 | 700 | 0 | 500 | 500 | 0 |
| | | n-Hexane | 0 | 0 | 0 | 0 | 700 | 0 | 0 | 0 |
| | Polymerization initiator | Lauroyl peroxide | 1 | 0 | 1 | 1 | 0 | 1 | 1 | 1 |
| | | 2,2'-Azobis(2,4-dimethylvaleronitrile) | 0 | 0 | 0 | 0 | 2 | 0 | 0 | 0 |
| | | Azobisisobutyronitrile | 0 | 1 | 0 | 0 | 0 | 0 | 0 | 0 |
| | antioxidant | Pentaerythritol tetrakis(thioglycolate) | 0 | 0 | 0 | 4 | 0 | 0 | 0 | 0 |

TABLE 1-continued

| Component | Composition | Ex. 1 | Ex. 2 | Ex. 3 | Ex. 4 | Ex. 5 | Ex. 6 | Com. Ex. 1 | Com. Ex. 2 |
|---|---|---|---|---|---|---|---|---|---|
| Content contained in monomer mixture (% by weight) | Methyl methacrylate | 50 | 50 | 40 | 40 | 40 | 20 | 67 | 50 |
| | (Meth)acrylic-based cross-linkable monomer | 50 | 50 | 60 | 60 | 60 | 80 | 33 | 50 |
| Amount of organic solvent used (weight with respect to 100 parts by weight of monomer mixture) | | 125 | 150 | 175 | 175 | 175 | 125 | 167 | 0 |
| Specific surface area ($m^2/g$) | | 132 | 138 | 175 | 170 | 178 | 148 | 125 | 1.1 |
| Pore volume (ml/g) | | 0.44 | 0.46 | 0.65 | 0.62 | 0.65 | 0.45 | 0.35 | — |
| Average pore size (nm) | | 16 | 14 | 14 | 14 | 15 | 16 | 20 | — |
| Thermal decomposition starting temperature (° C.) | | 260 | 261 | 265 | 292 | 263 | 268 | 255 | 251 |
| Amount of residual methyl methacrylate (ppm) | | 10 | 10 | 8 | 15 | 15 | 10 | 12 | 7800 |
| Amount of polymerization initiator residue (ppm) | | * | * | * | * | * | * | * | 330 |
| Amount of residual metal (ppm) | | 68 | 55 | 40 | 82 | 45 | 75 | 15 | 36 |

* Less than quantitation limit (100 ppm)

From the results shown in Table 1, it is seen that the resin particles of Examples 1 to 6 were resin particles having a large number of pores (porous resin particles), having a specific surface area of 130 to 180 $m^2/g$ (more specifically, 132 to 178 $m^2/g$), a pore volume of 0.3 to 0.7 ml/g (more specifically, 0.44 to 0.65 ml/g), and an average pore size of 13 to 16 nm (more specifically, 14 to 16 nm). Furthermore, it is seen that the resin particles of Comparative Example 1 had a specific surface area smaller than that of the resin particles of each of Examples 1 to 6, that is, they were resin particles having low porosity, and that the resin particles of Comparative Example 2 had no pore.

Furthermore, it is seen that the resin particles of Examples 1 to 6 were resin particles having a thermal decomposition starting temperature higher than that of the resin particles of each of Comparative Examples 1 and 2, whose specific surface area was smaller than that of the resin particles of each of Examples 1 to 6, that is, the resin particles of Examples 1 to 6 were resin particles having high thermal resistance.

Specifically, it is seen that the resin particles of Examples 1 to 6 manufactured using a monomer mixture containing 50 to 90% by weight (more specifically, 50 to 80% by weight) of (meth)acrylic-based cross-linkable monomer, together with an organic solvent, had a thermal decomposition starting temperature of 260° C. or more, that is, the resin particles of Examples 1 to 6 were excellent in the thermal resistance. On the other hand, it is seen that the resin particles of Comparative Example 1 manufactured using a monomer mixture containing less than 50% by weight (more specifically, 33% by weight) of (meth)acrylic-based cross-linkable monomer, and the resin particles of Comparative Example 2 manufactured using no organic solvent had a thermal decomposition starting temperature of 255° C. or less, that is, the resin particles of Comparative Examples 1 and 2 were poorer in the thermal resistance than the resin particles of Examples 1 to 6.

Furthermore, it is seen that the amount of residual methyl methacrylate of the resin particles of Examples 1 to 6 was 20 ppm or less, which was smaller than the amount of residual methyl methacrylate of the resin particles of Comparative Example 2.

Furthermore, it is seen that the amount of polymerization initiator residue of the resin particles of Examples 1 to 6 was less than quantitation limit (100 ppm), which was smaller than the amount of polymerization initiator residue of the resin particles of Comparative Example 2.

Moreover, it is seen that the amount of residual metal of the resin particles of Examples 1 to 6 was 100 ppm or less, that is, almost no metal derived from the inorganic dispersion stabilizer remained in the resin particles of Examples 1 to 6.

As described above, it is seen that the porous resin particles of Examples 1 to 6 manufactured using the method of manufacturing porous resin particles of the present invention, that is, the porous resin particles of the present invention had a sufficient porosity (specifically, a specific surface area of 130 to 180 $m^2/g$, a pore volume of 0.3 to 0.7 ml/g, and an average pore size of 13 to 16 nm) that allows light diffusing properties to be sufficiently exhibited, and were excellent in the thermal resistance.

Example 7

Example of Manufacturing External Preparation (Powder Foundation)

First, 10 parts by weight of resin particles (porous resin particles) obtained in Example 2, 42 parts by weight of talc as the ingredient of a color material, 17 parts by weight of sericite as the clay mineral, 10 parts by weight of titanium oxide as the ingredient of a color material, 0.6 parts by weight of red iron oxide as the ingredient of a color material, 1 part by weight of yellow iron oxide as the ingredient of a color material, 0.1 parts by weight of black iron oxide as the ingredient of a color material, 2 parts by weight of liquid paraffin as the hydrocarbon, 3.5 parts by weight of octyldecyl myristate as the fatty acid ester, 0.5 parts by weight of sorbitan isostearate as the surfactant, and 3.0 parts by weight of 2-octyl dodecanol as the higher alcohol were prepared as ingredients for a formulation. Then, the resin particles, the talc, the sericite, the titanium oxide, the red iron oxide, the yellow iron oxide, and the black iron oxide were mixed using a Henschel mixer, a mixture solution of the liquid paraffin, the octyldecyl myristate, the sorbitan isostearate, and the 2-octyl dodecanol was mixed thereto, and the obtained material was uniformly mixed. The obtained material was pulverized and sieved using known methods, and, thus, a powder was obtained. This powder was compression-molded in a metal plate using a known method, and, thus, a powder foundation was obtained.

Example 8

Example of Manufacturing External Preparation (Emulsion-Type Foundation)

First, 20.0 parts by weight of resin particles (porous resin particles) obtained in Example 2, 6.0 parts by weight of sericite as the clay mineral, 3.0 parts by weight of titanium oxide as the ingredient of a color material, and pigment (appropriate amount) were mixed using a Henschel mixer, and, thus, a powder component was prepared.

Then, separately from the powder component, 5.0 parts by weight of polyethylene glycol (polyethylene glycol 4000), 1.0 parts by weight of triethanolamine as the pH control agents, 5.0 parts by weight of propylene glycol, and 0.5 parts by weight of Veegum (registered trademark, manufactured by Vanderbilt) as the clay mineral were added to 50.2 parts by weight of purified water, and were dissolved with the application of heat. The previously prepared powder component was added to the thus obtained solution, and the powder was uniformly dispersed using a homo mixer, after which the temperature of the mixture was kept at 70° C., and, thus, an aqueous phase component was obtained.

Next, separately from the aqueous phase component, 2.0 parts by weight of stearic acid as the higher fatty acid, 0.3 parts by weight of cetyl alcohol as the higher alcohol, 20.0 parts by weight of liquid paraffin as the hydrocarbon, flavoring substance (appropriate amount), and antiseptic (appropriate amount) were mixed, and dissolved with the application of heat, after which the temperature of the mixture was kept at 70° C., and, thus, an oil phase component was obtained.

The aqueous phase component was added to the obtained oil phase component, and the mixture was subjected to preliminary emulsification, uniformly emulsified and dispersed using a homo mixer, and, then, cooled down with stirring, and, thus, an emulsion-type foundation was obtained.

Example 9

Example of Manufacturing External Preparation (Body Powder)

First, 50.0 parts by weight of resin particles (porous resin particles) obtained in Example 2, 25.0 parts by weight of mica as the clay mineral, and 25.0 parts by weight of sericite as the clay mineral were mixed using a Henschel mixer. Then, the mixture was pulverized once using a Rotor Speed Mill ZM-100 manufactured by Retsch (with a 12-blade rotor and a 1-mm screen, at a rotational speed of 14000 rpm), and, thus, a body powder was obtained.

Comparative Example 3

Comparative Example of Manufacturing External Preparation (Powder Foundation)

A powder foundation was obtained as in Example 7, except that the resin particles obtained in Comparative Example 2 were used instead of the resin particles obtained in Example 2.

Comparative Example 4

Comparative Example of Manufacturing External Preparation (Emulsion-Type Foundation)

A powder foundation was obtained as in Example 8, except that the resin particles obtained in Comparative Example 2 were used instead of the resin particles obtained in Example 2.

Comparative Example 5

Comparative Example of Manufacturing External Preparation (Body Powder)

A body powder was obtained as in Example 9, except that the resin particles obtained in Comparative Example 2 were used instead of the resin particles obtained in Example 2.

Sensory Test of External Preparations

The external preparations of Examples 7 to 9 and Comparative Examples 3 to 5 were subjected to a sensory test with 10 panelists. In this test, the powder foundations were evaluated regarding the items "soft focusing properties", "makeup lasting time", "spreadability", and "softness", the emulsion-type foundations were evaluated regarding the items "soft focusing properties", "makeup lasting time", and "smoothness", and the body powders were evaluated regarding the items "soft focusing properties", "spreadability", and "silky feel". The evaluation regarding these evaluation items was performed on a 4-grade scale according to the following standards.

Poor . . . 2 or less panelists out of 10 replied that the external preparation was effective Fair . . . 3 to 5 panelists out of 10 replied that the external preparation was effective Good . . . 6 to 8 panelists out of 10 replied that the external preparation was effective Excellent . . . 9 or more panelists out of 10 replied that the external preparation was effective Table 2 below shows the results of the sensory test performed on the external preparations of Examples 7 to 9 and Comparative Examples 3 to 5.

TABLE 2

|  | Ex. 7 Powder foundation | Ex. 8 Emulsion-type foundation | Ex. 9 Body powder | Com. Ex. 3 Powder foundation | Com. Ex. 4 Emulsion-type foundation | Com. Ex. 5 Body powder |
| --- | --- | --- | --- | --- | --- | --- |
| Soft focusing properties | Excellent | Excellent | Good | Poor | Poor | Poor |
| Makeup lasting time | Good | Good | Good | Poor | Poor | Poor |
| Spreadability | Good | Good | Good | Poor | Poor | Poor |
| Softness | Good | Good | Good | Poor | Poor | Poor |
| Smoothness | Good | Good | Good | Poor | Poor | Poor |
| Silky feel | Good | Good | Good | Poor | Poor | Poor |

As shown in Table 2, it is seen that, compared with the powder foundation of Comparative Example 3, the powder foundation of Example 7 had longer makeup lasting time, better spreadability on the skin, and softer feel, and further had higher soft focusing properties, that is, provided natural finish making the skin look natural.

Furthermore, it is seen that, compared with the emulsion-type foundation of Comparative Example 4, the emulsion-type foundation of Example 8 had longer makeup lasting time, smoother feel, and higher soft focusing properties, that is, provided natural finish making the skin look natural.

Furthermore, it is seen that, compared with the body powder of Comparative Example 5, the body powder of Example 9 had better spreadability on the skin, improved the skin to a silky state, and, furthermore, had higher soft focusing properties, that is, provided natural finish making the skin look natural.

Example 10

Example of Manufacturing Optical Film

First, 5 parts by weight of resin particles (porous resin particles) obtained in Example 2, 29 parts by weight of acrylic-based resin (brand name: Medium VM (K), manufactured by Dainichiseika Color & Chemicals Mfg. Co., Ltd., solid content 32% by weight) as the binder resin, and 41 parts by weight of toluene were mixed, and stirred using a centrifugal stirrer for 3 minutes, and, thus, a coating agent was obtained. Subsequently, the obtained coating agent was applied onto a PET film as the base material using a 50 μm coater. The obtained film was dried for 1 hour in a drier kept at 70° C., and, thus, an optical film was obtained. The haze, the total light transmission, and the gloss of the obtained optical film were measured. Table 3 shows the results.

Example 11

Example of Manufacturing Optical Film

An optical film was obtained as in Example 10, except that a coating agent obtained by mixing 1 part by weight of resin particles (porous resin particles) obtained in Example 2, 29 parts by weight of acrylic-based resin (brand name: Medium VM (K), manufactured by Dainichiseika Color & Chemicals Mfg. Co., Ltd., solid content 32% by weight) as the binder resin, and 41 parts by weight of toluene, and stirring the mixture using a centrifugal stirrer for 3 minutes was used. The haze, the total light transmission, and the gloss of the obtained optical film were measured. Table 4 shows the results.

Comparative Example 6

Comparative Example of Manufacturing Optical Film

A light diffusion film was obtained as in Example 10, except that the resin particles of Comparative Example 2 were used instead of the resin particles of Example 2. The haze, the total light transmission, and the gloss of the obtained film were measured. Table 3 shows the results.

Comparative Example 7

Comparative Example of Manufacturing Optical Film

A light diffusion film was obtained as in Example 11, except that the resin particles of Comparative Example 2 were used instead of the resin particles of Example 2. The haze, the total light transmission, and the gloss of the obtained film were measured. Table 4 shows the results.

Method of Measuring the Total Light Transmission and the Haze

The haze and the total light transmission of the optical films obtained in Examples 10 and 11 and Comparative Examples 6 and 7 were measured using a haze meter "NDH-4000" (manufactured by Nippon Denshoku Industries Co., Ltd.). The total light transmission was measured according to JIS K 7361-1, and the haze was measured according to JIS K 7136. Note that the haze and the total light transmission shown in Tables 3 and 4 are averages of measured values of two measurement samples (the number of measurement samples n=2). The more light (transmitted light) transmitted through the optical film is diffused, the larger the haze value becomes.

Method of Measuring the Gloss

The gloss of the optical films obtained in Examples 10 and 11 and Comparative Examples 6 and 7 was measured using a gloss checker (gloss meter) "IG-331" (manufactured by Horiba, Ltd.). Specifically, the gloss of the optical films was measured at 60° according to the method as defined in JIS Z8741 using the gloss checker (gloss meter) "IG-331". The more light reflected by the surface of the optical film (specifically, the surface of the coating film formed by the application of the coating agent) is diffused, the smaller the gloss value becomes, indicating that the optical film has better mat properties.

TABLE 3

|  | Ex. 10 | Com. Ex. 6 |
| --- | --- | --- |
| Haze (%) | 77.4 | 72.2 |
| Total light transmission (%) | 78.2 | 80.6 |
| Gloss (60°) | 9.3 | 16.3 |

TABLE 4

|  | Ex. 11 | Com. Ex. 7 |
| --- | --- | --- |
| Haze (%) | 42.9 | 40.2 |
| Total light transmission (%) | 92.1 | 86.6 |
| Gloss (60°) | 49.3 | 54.3 |

The content of resin particles contained in the coating agent used to manufacture the optical film in Example 10 is the same as the content of resin particles contained in the coating agent used to manufacture the optical film in Comparative Example 6. As shown in Table 3, the optical film of Example 10 manufactured using, as the resin particles, the resin particles obtained in Example 2 had higher haze and lower gloss than those of the optical film of Comparative Example 6 manufactured using, as the resin particles, the resin particles of Comparative Example 2. That is to say, it is seen that the optical film of Example 10 was excellent in the light diffusing properties and excellent in the mat properties compared with the optical film of Comparative Example 6.

Furthermore, the content of resin particles contained in the coating agent used to manufacture the optical film in Example 11 is the same as the content of resin particles contained in the coating agent used to manufacture the optical film in Comparative Example 7. As shown in Table 4, the optical film of Example 11 manufactured using, as the resin particles, the resin particles obtained in Example 2 had higher haze, higher total light transmission, and lower gloss than those of the optical film of Comparative Example 7 manufactured using, as the resin particles, the resin particles of Comparative Example 2. That is to say, it is seen that the optical film of Example 11 was excellent in the light diffusing properties and excellent in the mat properties compared with the optical film of Comparative Example 7.

Accordingly, it will be appreciated that the resin particles obtained in Example 2 can provide an optical film with excellent light diffusing properties and excellent mat properties compared with the resin particles of Comparative Example 2.

The present invention can be practiced in other different forms without departing from the spirit and essential characteristics thereof. Therefore, the above-described embodiments are considered in all respects as illustrative and not restrictive. The scope of the invention is indicated by the appended claims rather than by the foregoing description. All variations and modifications falling within the equivalency range of the appended claims are intended to be embraced therein.

This application claims priority on Patent Application No. 2012-071485 filed in Japan on Mar. 27, 2012, the entire contents of which are herein incorporated by reference.

INDUSTRIAL APPLICABILITY

The porous resin particles of the present invention can be used, for example, as additives (matting agents, coating film softening agents, designing agents, etc.) to coating agents (coating compositions) that can be used as coating materials, coating agents for paper, coating agents for information recording paper, or coating agents for optical members such as optical films, or the like; light diffusion agents that can be mixed into resin compositions for manufacturing molded bodies such as light diffusion members (illumination covers, light diffusion plates, light diffusion films, etc.); blocking preventing agents for films such as food wrapping films; and ingredients of external preparations, such as additives (additives for improving the smoothness, or clearing skin problems such as dark spots or wrinkles) to cosmetics and other external preparations.

What is claimed is:

1. Porous resin particles made of a polymer of a monomer mixture, wherein the monomer mixture contains, as monomers, at least methyl methacrylate and a (meth)acrylic-based cross-linkable monomer, a content of the methyl methacrylate in the monomer mixture is 1 to 50% by weight, a content of the (meth)acrylic-based cross-linkable monomer in the monomer mixture is 50 to 99% by weight, the porous resin particles have a specific surface area of 130 to 180 $m^2/g$, a pore volume of 0.3 to 0.7 ml/g, and an average pore size of 13 to 16 nm, an amount of unreacted methyl methacrylate remaining in the porous resin particles is 20 ppm or less, and the porous resin particles have a thermal decomposition starting temperature of 260° C. or more.

2. The porous resin particles according to claim 1, wherein the (meth)acrylic-based cross-linkable monomer is ethylene glycol dimethacrylate.

3. An external preparation containing the porous resin particles according to claim 2.

4. A coating agent containing the porous resin particles according to claim 2.

5. An optical film formed by applying the coating agent according to claim 4 to a base material.

6. A resin composition containing the porous resin particles according to claim 2 and a base material resin.

7. The porous resin particles according to claim 1, having a volume-average particle size of 1 to 20 μm.

8. An external preparation containing the porous resin particles according to claim 7.

9. A coating agent containing the porous resin particles according to claim 7.

10. An optical film formed by applying the coating agent according to claim 9 to a base material.

11. A resin composition containing the porous resin particles according to claim 7 and a base material resin.

12. An external preparation containing the porous resin particles according to claim 1.

13. A coating agent containing the porous resin particles according to claim 1.

14. An optical film formed by applying the coating agent according to claim 13 to a base material.

15. The porous resin particles according to claim 1, containing an antioxidant.

16. A resin composition containing the porous resin particles according to claim 15 and a base material resin.

17. A resin composition containing the porous resin particles according to claim 1 and a base material resin.

18. A molded body formed by molding the resin composition according to claim 17.

19. A method of manufacturing porous resin particles, comprising:
    a polymerization step of suspension-polymerizing a monomer mixture containing 1 to 50% by weight of methyl methacrylate and 50 to 99% by weight of (meth)acrylic-based cross-linkable monomer, in the presence of 120 to 180 parts by weight of organic solvent with respect to 100 parts by weight of the monomer mixture, a polymerization initiator, and an inorganic dispersion stabilizer, in an aqueous medium, thereby obtaining a suspension containing porous resin particles;
    a distillation step of, after the polymerization step, distilling the suspension, thereby removing the organic solvent from the suspension;
    a decomposition and removal step of, after the distillation step, decomposing and removing the inorganic dispersion stabilizer contained in the suspension; and
    a drying step of, after the decomposition and removal step, drying the porous resin particles collected by filtering from the suspension, at 80° C. or more, under a reduced pressure of 0.015 MPa or less, for 12 hours or more.

* * * * *